United States Patent [19]

Noi

[11] Patent Number: 4,781,859

[45] Date of Patent: Nov. 1, 1988

[54] VOLTAGE-DEPENDENT NON-LINEAR RESISTANCE CERAMIC COMPOSITION

[75] Inventor: Keiichi Noi, Tsuzuki, Japan

[73] Assignee: Matsushita Electric Industrial Co., Ltd., Kadoma, Japan

[21] Appl. No.: 930,995

[22] Filed: Nov. 14, 1986

Related U.S. Application Data

[63] Continuation of Ser. No. 715,945, Mar. 25, 1985, abandoned.

[30] Foreign Application Priority Data

| Mar. 30, 1984 | [JP] | Japan | 59-64014 |
| May 31, 1984 | [JP] | Japan | 59-111171 |
| May 31, 1984 | [JP] | Japan | 59-111172 |
| Aug. 18, 1984 | [JP] | Japan | 59-171987 |
| Aug. 18, 1984 | [JP] | Japan | 59-171988 |
| Aug. 18, 1984 | [JP] | Japan | 59-171989 |
| Aug. 18, 1984 | [JP] | Japan | 59-171990 |
| Aug. 18, 1984 | [JP] | Japan | 59-171991 |

[51] Int. Cl.$^4$ .................... H01B 1/08; C04B 35/46
[52] U.S. Cl. .................... 252/520; 252/521; 501/136; 501/138; 501/139
[58] Field of Search ............... 501/138, 136, 137, 139; 252/520, 521

[56] References Cited

U.S. PATENT DOCUMENTS

| 4,438,214 | 3/1984 | Masuyama et al. ........... 501/136 X |
| 4,545,929 | 10/1985 | Masuyama et al. ........... 501/136 X |
| 4,547,314 | 10/1985 | Masuyama et al. ........... 501/136 X |

FOREIGN PATENT DOCUMENTS

| 0040391 | 11/1981 | European Pat. Off. ............ 501/139 |
| 0070540 | 1/1983 | European Pat. Off. ............ 501/136 |
| 0101824 | 3/1984 | European Pat. Off. ............ 501/136 |
| 0068899 | 6/1978 | Japan ................................ 501/136 |
| 0078414 | 5/1983 | Japan ................................ 501/136 |
| 2080789 | 2/1982 | United Kingdom ................ 501/136 |

*Primary Examiner*—William R. Dixon, Jr.
*Assistant Examiner*—Karl Group
*Attorney, Agent, or Firm*—Cushman, Darby & Cushman

[57] ABSTRACT

A voltage-dependent non-linear resistance ceramic composition comprises $SrTiO_3$, $Sr_{1-x}Ba_xTiO_3$ ($0.001 \leq x \leq 0.300$) or $Sr_{1-x}Ca_xTiO_3$ ($0.001 \leq x \leq 0.300$) as host material and further includes 0.001–2.000 mol % of $Y_2O_3$ as metal oxide for semiconductorization acceleration, 0.001–3.000 mol % of metal oxide(s) of at least one selected from the group consisting of $Ca_2O_3$, $CuO$, $Ag_2O$, $Al_2O_3$, $ZrO_2$, $BaO$, $SiO_2$, $MgO$, $B_2O_3$, $MnO_2$, $NiO$, $MoO_3$, $BeO$, $Fe_2O_3$, $Li_2O$, $Cr_2O_3$, $PbO$, $CaO$, $TiO_2$, $P_2O_5$, $Sb_2O_3$ and $V_2O_5$, which segregates at grain boundary to make the grain boundary selectively to high resistances; an element made of the composition has both characteristics of capacitance and varistor, and is suitable for filter to remove noise or surge.

12 Claims, 3 Drawing Sheets

VOLTAGE-DEPENDENT NON-LINEAR RESISTANCE CERAMIC COMPOSITION

This is a continuation of application Ser. No. 715,945 filed Mar. 25, 1985 which was abandoned upon the filing hereof.

DESCRIPTION

1. Technical Field

The present invention relates to a voltage dependent non-linear resistance ceramic composition for use in surge absorbing, noise elimination and a measure against undesirable electric changing in various electric apparatuses and electronic apparatuses.

2. Background Art

Heretofore, in various electric apparatuses and electronic apparatuses, in order to absorb extraordinary high voltage, elimination of noise, elimination of arc, and the like, SiC baristors or varistors of ZnO system having a voltage-dependent non-linear resistance characteristics are used. Voltage-current characteristic of such baristors can be approximately represented by the following equation:

$$I = (V/C)^\alpha,$$

wherein I is current, V is voltage, C is a constant proper for the baristor, and $\alpha$ is a voltage non-linearity exponent.

The $\alpha$ of the SiC baristor is about 2-7, and for the ZnO system baristor there is ones that reaching 50. Though such baristors has superior characteristic for absorbing relatively high voltage called surge, for voltages lower than baristor voltage (for instance, absorption of noise) almost no effect is represented since its dielectric constant is low and its inherent capacitance is small, and their dielectric loss tan $\delta$ are so large as 5-10%.

On the other hand, for elimination of low voltage noise, static electricity, or the like, by appropriately selecting composition and firing condition, semiconductor ceramic capacitors having apparent dielectric constant of about $5 \times 10^4 - 6 \times 10^4$ and tan $\delta$ of about 1% are utilized.

However, these semiconductor ceramic capacitor is liable to be destroyed or become to be non-functional as capacitors when extraordinary high voltage such as surge is impressed thereon or a current above a certain limit is impressed on the element. For such reason, in the electric apparatuses or electronic apparatuses, for the purpose of both the absorbing of high voltage surge and the elimination of low voltage noise, the baristors are used being combined with capacitors and other component (for instance, coil), and for instance, a noise filter has such configuration.

Figure 1:
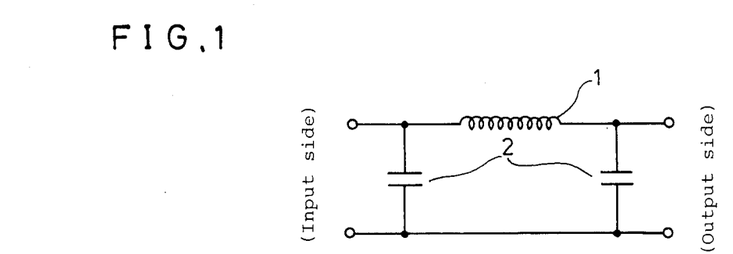
FIG. 1 is a circuit diagram of a general noise filter.
Figure 2:
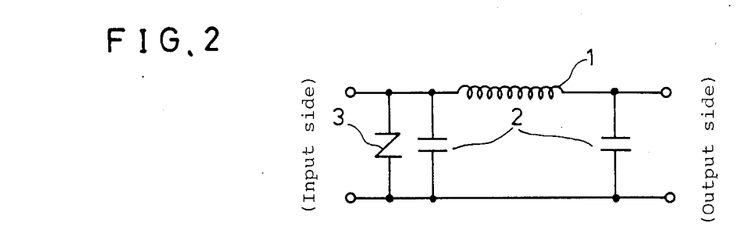
FIG. 2 is a circuit diagram of a noise filter using the conventional varistors and the capacitors.
Figure 3:
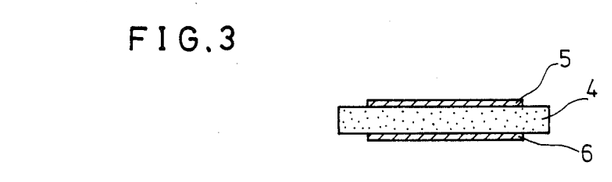
FIG. 3 is a sectional view of an element using voltage dependent non-linear resistance ceramic composition in accordance with the present invention.

FIG. 1 shows general noise filter circuit, FIG. 2 shows conventional noise filter circuit constituted by combining a baristor, capacitors and a coil, and 1 is the coil, 2 are the capacitors and 3 is the baristor.

Figure 5:
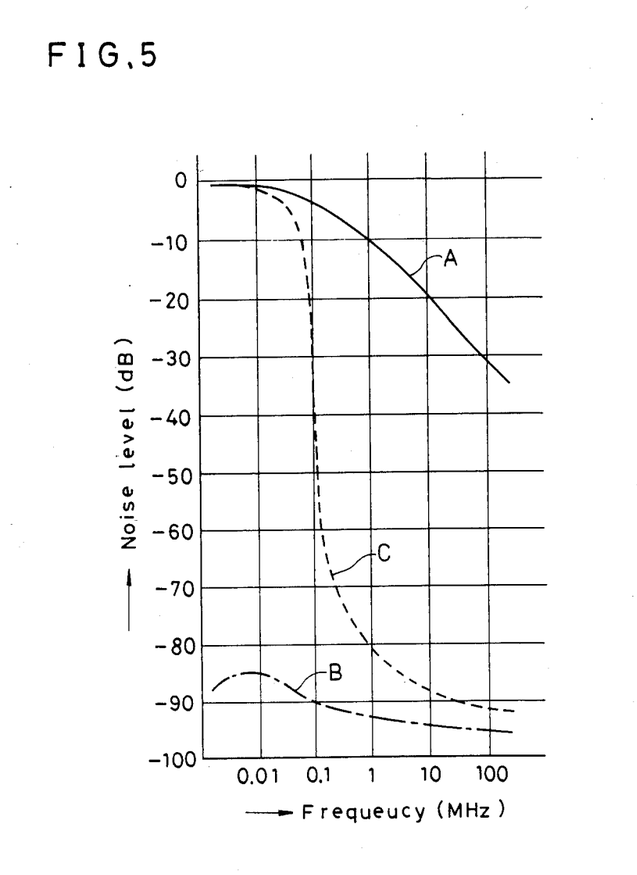
FIG. 5 is a characteristic chart showing situation of input noise and output in accordance with circuit of noise filters of the present invention and the prior art.

When a noise input A shown in FIG. 5 is impressed on these circuits, output characteristic from general noise filter circuit of FIG. 1 is such as C of FIG. 5, and noise is not eliminated sufficiently. Output characteristic from the conventional noise filter circuit including a baristor shown in FIG. 2 is such as B of FIG. 5, and though noise is eliminated, such configuration has a shortcoming that it has large number of components in the inside of the apparatus and besides is contrary to tendency of miniaturization of the apparatus.

Accordingly, an electronic component, which absorbs extrraordinary high voltage, can eliminate low voltage, such as noise and has small number of components, and capable of miniaturization, is demanded.

SUMMARY OF THE INVENTION

Accordingly, the present invention intends to provide a voltage-dependent non-linear resistance ceramic composition comprising $SrTiO_3$, $Sr_{1-x}Ba_xTiO_3$ ($0.001 \leq x \leq 0.300$) or $Sr_{1-x}Ca_xTiO_3$ ($0.001 \leq x \leq 0.300$) as host material, including 0.001-2.000 mol % of $Y_2O_3$ as metal oxide for semiconductorization acceleration, and including 0.001-3.000 mol % of oxide(s) of at least one metal selected from the group consisting of $Co_2O_3$, $CuO$, $Ag_2O$, $Al_2O_3$, $ZrO_2$, $BaO$, $SiO_2$, $MgO$, $B_2O_3$, $MnO_2$, $NiO$, $MoO_3$, $BeO$, $Fe_2O_3$, $Li_2O$, $Cr_2O_3$, $PbO$, $CaO$, $TiO_2$, $P_2O_5$, $Sb_2O_3$ and $V_2O_5$, which segregates at grain boundary to make the grain boundary to high resistance.

THE BEST MODE FOR EMBODYING THE INVENTION

As a result of accumulation of various experiments, the inventors made a voltage dependent non-linear resistance ceramic composition in a quite different system from the conventional composition by making $SrTiO_3$, $Sr_{1-x}Ba_xTiO_3$ ($0.001 \leq x \leq 0.300$) or $Sr_{1-x}Ca_xTiO_3$ ($0.001 \leq x \leq 0.300$) as host material, and $Y_2O_3$ as semiconductorization accelerating agent, and by further adding $Co_2O_3$ and $CuO$, and further adding if necessary an appropriate amount of additive. Hereafter, the present invention is described with respect to embodiments, with reference to the accompanying drawings.

<EXAMPLE 1>

After measuring $SrCO_3$ and $TiO_2$ in a manner that $SrTiO_3$ having Sr/Ti atom ratio of 0.98 is obtained, and they are blended for 15 hours in wet method in a ball-mill or the like. And after driving the mixture is then dried, and then is grounded. Thereafter the grounded powder is calcinated for 3 hours at 1100° C. in the air and again grounded to produce $SrTiO_3$ powder.

Next, $SrTiO_3$, $Y_2O_3$, $Co_2O_3$, $CuO$, $Ag_2O$ and $Al_2O_3$ are measured and blended in an ingredient component as shown in the following Table 1.

TABLE 1

| Sample No. | First component SrTiO$_3$ (mol %) | Second component Y$_2$O$_3$ (mol %) | Third component Co$_2$O$_3$ (mol %) | Fourth component CuO (mol %) | Fifth component Additive | Fifth component mol % |
|---|---|---|---|---|---|---|
| 1* | 99.999 | 0.001 | 0.000 | 0.000 | — | 0.000 |
| 2* | 99.900 | 0.100 | 0.000 | 0.000 | — | 0.000 |
| 3* | 99.000 | 1.000 | 0.000 | 0.000 | — | 0.000 |
| 4* | 98.000 | 2.000 | 0.000 | 0.000 | — | 0.000 |
| 5* | 97.000 | 3.000 | 0.000 | 0.000 | — | 0.000 |
| 6* | 99.998 | 0.001 | 0.001 | 0.000 | — | 0.000 |
| 7 | 99.889 | 0.100 | 0.010 | 0.001 | — | 0.000 |
| 8 | 99.199 | 0.300 | 0.500 | 0.001 | — | 0.000 |
| 9 | 97.999 | 1.000 | 1.000 | 0.001 | — | 0.000 |
| 10 | 96.499 | 1.500 | 2.000 | 0.001 | — | 0.000 |
| 11* | 95.499 | 1.500 | 3.000 | 0.001 | — | 0.000 |
| 12 | 99.988 | 0.001 | 0.001 | 0.010 | — | 0.000 |
| 13 | 99.889 | 0.010 | 0.001 | 0.100 | — | 0.000 |
| 14 | 99.489 | 0.010 | 0.001 | 0.500 | — | 0.000 |
| 15 | 97.999 | 1.000 | 0.001 | 1.000 | — | 0.000 |
| 16* | 96.999 | 1.000 | 0.001 | 2.000 | — | 0.000 |
| 17 | 99.700 | 0.100 | 0.100 | 0.100 | — | 0.000 |
| 18 | 99.300 | 0.100 | 0.300 | 0.300 | — | 0.000 |
| 19 | 98.600 | 0.100 | 0.300 | 1.000 | — | 0.000 |
| 20 | 98.600 | 0.100 | 1.000 | 0.300 | — | 0.000 |
| 21 | 97.700 | 0.300 | 1.500 | 0.500 | — | 0.000 |
| 22 | 97.200 | 1.000 | 1.000 | 0.800 | — | 0.000 |
| 23 | 96.000 | 2.000 | 1.000 | 1.000 | — | 0.000 |
| 24 | 99.699 | 0.100 | 0.100 | 0.100 | Ag$_2$O | 0.001 |
| 25 | 99.699 | 0.100 | 0.100 | 0.100 | Al$_2$O$_3$ | 0.001 |
| 26 | 99.490 | 0.100 | 0.300 | 0.100 | Ag$_2$O | 0.010 |
| 27 | 99.200 | 0.100 | 0.300 | 0.100 | Al$_2$O$_3$ | 0.300 |
| 28 | 98.250 | 0.300 | 0.300 | 0.150 | Ag$_2$O | 1.000 |
| 29 | 97.150 | 0.500 | 0.300 | 0.050 | Al$_2$O$_3$ | 2.000 |
| 30 | 95.900 | 0.500 | 0.500 | 0.100 | Al$_2$O$_3$ | 3.000 |
| 31* | 94.950 | 0.800 | 0.700 | 0.050 | Ag$_2$O | 3.500 |
| 32 | 99.699 | 0.100 | 0.100 | 0.050 | Ag$_2$O / Al$_2$O$_3$ | 0.001 / 0.050 |
| 33 | 99.240 | 0.100 | 0.100 | 0.050 | Ag$_2$O / Al$_2$O$_3$ | 0.010 / 0.500 |
| 34 | 98.650 | 0.100 | 0.100 | 0.050 | Ag$_2$O / Al$_2$O$_3$ | 0.100 / 1.000 |
| 35 | 97.350 | 0.300 | 0.200 | 0.100 | Ag$_2$O / Al$_2$O$_3$ | 0.050 / 2.000 |
| 36 | 96.840 | 0.300 | 0.300 | 0.050 | Ag$_2$O / Al$_2$O$_3$ | 0.010 / 2.500 |
| 37* | 95.800 | 0.500 | 0.200 | 0.100 | Ag$_2$O / Al$_2$O$_3$ | 0.200 / 3.200 |

Marked * are comparison examples which are outside the claimed scope.

Further, the mixture is blended in a ball mill for 20 hours, dried and then grounded. And subsequently, by adding 10–15 weight % of organic binder such as polyvinylalchohol the powder is granulated, and formed in a shape and size of 10 mm diameter and 1 mm thick disk by application of a pressing force of about 1.0 t/cm$^2$.

Then, the press-formed disk is fired for 4 hours at a temperature of 1380° C. in a reducing atmosphere of N$_2$(90% in volume)+H$_2$(10% in volume). It is further heat treated at 1100° C. for 4 hours in the air. The disk shaped sintered body 1 shown in FIG. 1 obtained in the above-mentioned process has almost the same component ratio as that of the starting materials.

On both faces of the sintered body 1, electrodes 2 and 3 are formed by applying conductive paint containing silver powder or the like and subsequently burning it.

Characteristics of the element obtained in the above-mentioned manner is shown in Table 2.

TABLE 2

| Sample No. | $V_{1\ mA/mm}$(V) | $\alpha$ | $\epsilon$ | tan $\cdot$ $\delta$ (%) |
|---|---|---|---|---|
| 1* | 83.0 | 1.3 | $1.0 \times 10^6$ | 94.0 |
| 2* | 85.5 | 1.9 | $1.4 \times 10^6$ | 91.2 |
| 3* | 82.0 | 2.8 | $1.2 \times 10^6$ | 87.1 |
| 4* | 94.0 | 3.5 | $7.6 \times 10^5$ | 77.0 |
| 5* | 103.7 | 4.4 | $3.2 \times 10^5$ | 70.8 |
| 6* | 50.6 | 6.0 | $1.9 \times 10^4$ | 6.4 |
| 7 | 37.3 | 7.9 | $3.2 \times 10^4$ | 3.8 |
| 8 | 33.8 | 8.0 | $3.9 \times 10^4$ | 3.1 |
| 9 | 31.7 | 8.6 | $4.5 \times 10^4$ | 3.0 |
| 10 | 35.4 | 8.1 | $5.2 \times 10^4$ | 3.1 |
| 11* | 55.1 | 7.2 | $9.4 \times 10^4$ | 6.0 |
| 12 | 42.5 | 8.2 | $4.9 \times 10^4$ | 4.0 |
| 13 | 43.8 | 8.9 | $5.8 \times 10^4$ | 3.8 |
| 14 | 58.2 | 9.2 | $4.0 \times 10^4$ | 3.5 |
| 15 | 70.4 | 10.3 | $3.3 \times 10^4$ | 3.1 |
| 16* | 210.3 | 10.0 | $3.1 \times 10^3$ | 1.4 |
| 17 | 35.2 | 8.0 | $5.2 \times 10^4$ | 3.5 |
| 18 | 30.7 | 8.7 | $5.6 \times 10^4$ | 3.4 |
| 19 | 47.1 | 9.3 | $5.0 \times 10^4$ | 3.0 |
| 20 | 43.3 | 9.5 | $4.7 \times 10^4$ | 3.1 |
| 21 | 39.9 | 9.7 | $4.6 \times 10^4$ | 3.0 |
| 22 | 37.8 | 10.2 | $4.8 \times 10^4$ | 3.0 |
| 23 | 41.0 | 10.5 | $4.4 \times 10^4$ | 3.0 |
| 24 | 42.3 | 9.3 | $6.1 \times 10^4$ | 2.4 |
| 25 | 40.7 | 8.7 | $5.2 \times 10^4$ | 3.3 |
| 26 | 44.4 | 9.9 | $6.3 \times 10^4$ | 2.2 |
| 27 | 42.3 | 9.1 | $5.0 \times 10^4$ | 3.1 |
| 28 | 57.2 | 10.7 | $4.1 \times 10^4$ | 1.9 |
| 29 | 48.1 | 10.0 | $4.2 \times 10^4$ | 3.0 |
| 30 | 50.3 | 9.8 | $3.9 \times 10^4$ | 2.9 |

TABLE 2-continued

| Sample No. | $V_{1\,mA/mm}(V)$ | α | ε | tan · δ (%) |
|---|---|---|---|---|
| 31* | 319.6 | 10.1 | $4.2 \times 10^3$ | 1.5 |
| 32 | 39.9 | 9.4 | $6.9 \times 10^4$ | 1.9 |
| 33 | 44.3 | 9.9 | $6.2 \times 10^4$ | 1.8 |
| 34 | 49.7 | 10.2 | $4.9 \times 10^4$ | 1.7 |
| 35 | 50.8 | 10.4 | $4.3 \times 10^4$ | 1.6 |
| 36 | 61.3 | 10.8 | $4.0 \times 10^4$ | 1.6 |
| 37* | 104.0 | 9.3 | $5.1 \times 10^3$ | 3.9 |

Marked * are comparison examples which are outside the claimed scope.

Herein, assessment of characteristics of the elements as varistor can be made by α and C in a voltage-current characteristic equation:

$$I = (V/C)^\alpha$$

wherein I is current, V is voltage, C is a constant proper to the varistor and α is a non-linearity exponent. In the present invention, since accurate measurement of C is difficult, characteristic assessment as varistor is made by the value of varistor voltage for unit thickness when 1 mA of varistor current is made to flow (hereinafter such varister voltage is called as $V_1mA/mm$), and by the value of $\alpha = 1/\log (V_{10}mA/V_1mA)$, wherein $V_{10}mA$ is a varistor voltage when a varistor current of 10 mA is flowed and $V_1mA$ is a varistor voltage when varistor current of 1 mA is flowed.

And characteristic assessment as the capacitors are made by a dielectric constant ε and dielectric loss tan δ at a measurement frequency of 1 KHz.

<EXAMPLE 2>

$SrCO_3$, $BaCO_3$ and $TiO_2$ are measured and blended in a manner to make $Sr_{0.9}Ba_{0.1}TiO_3$, and blended and grounded in a ball mill in a wet method for 15 hours. And the mixture is dried and ground, and then fired at 1200° C. for 3 hours, and further grounded thereby to prepare powder of $Sr_{0.9}Ba_{0.1}TiO_3$. Then, $Y_2O_3$, $Co_2O_3$, CuO, $Ag_2O$ and $Al_2O_3$ are measured added to the above-mentioned powder of $Sr_{0.9}Ba_{0.1}TiO_3$, in a manner to make the composition ratio shown Table 3.

TABLE 3

| Sample No. | First component $Sr_{0.9}Ba_{0.1}TiO_3$ (mol %) | Second component $Y_2O_3$ (mol %) | Third component $Co_2O_3$ (mol %) | Fourth component CuO (mol %) | Fifth component Additive | component mol % |
|---|---|---|---|---|---|---|
| 1* | 99.999 | 0.001 | 0 | 0 | — | — |
| 2* | 99.900 | 0.100 | 0 | 0 | — | — |
| 3* | 99.000 | 1.000 | 0 | 0 | — | — |
| 4* | 98.000 | 2.000 | 0 | 0 | — | — |
| 5* | 97.000 | 3.000 | 0 | 0 | — | — |
| 6* | 99.998 | 0.001 | 0.001 | 0 | — | — |
| 7 | 99.889 | 0.100 | 0.010 | 0.001 | — | — |
| 8 | 99.199 | 0.300 | 0.500 | 0.001 | — | — |
| 9 | 97.999 | 1.000 | 1.000 | 0.001 | — | — |
| 10 | 96.499 | 1.500 | 2.000 | 0.001 | — | — |
| 11* | 95.499 | 1.500 | 3.000 | 0.001 | — | — |
| 12 | 99.988 | 0.001 | 0.001 | 0.001 | — | — |
| 13 | 99.889 | 0.010 | 0.001 | 0.100 | — | — |
| 14 | 99.489 | 0.010 | 0.001 | 0.500 | — | — |
| 15 | 97.999 | 1.000 | 0.001 | 1.000 | — | — |
| 16* | 96.999 | 1.000 | 0.001 | 2.000 | — | — |
| 17 | 99.700 | 0.100 | 0.100 | 0.100 | — | — |
| 18 | 99.300 | 0.100 | 0.300 | 0.300 | — | — |
| 19 | 98.600 | 0.100 | 0.300 | 1.000 | — | — |
| 20 | 98.600 | 0.100 | 1.000 | 0.300 | — | — |
| 21 | 97.700 | 0.300 | 1.500 | 0.500 | — | — |
| 22 | 97.200 | 1.000 | 1.000 | 0.800 | — | — |
| 23 | 96.000 | 2.000 | 1.000 | 1.000 | — | — |
| 24 | 99.699 | 0.100 | 0.100 | 0.100 | $Ag_2O$ | 0.001 |
| 25 | 99.699 | 0.100 | 0.100 | 0.100 | $Al_2O_3$ | 0.001 |
| 26 | 99.490 | 0.100 | 0.300 | 0.100 | $Ag_2O$ | 0.010 |
| 27 | 99.200 | 0.100 | 0.300 | 0.100 | $Al_2O_3$ | 0.300 |
| 28 | 98.250 | 0.300 | 0.300 | 0.150 | $Ag_2O$ | 1.000 |
| 29 | 97.150 | 0.500 | 0.300 | 0.050 | $Al_2O_3$ | 2.000 |
| 30 | 95.900 | 0.500 | 0.500 | 0.100 | $Al_2O_3$ | 3.000 |
| 31* | 94.950 | 0.800 | 0.700 | 0.050 | $Ag_2O$ | 3.500 |
| 32 | 99.699 | 0.100 | 0.100 | 0.050 | $Ag_2O$ $Al_2O_3$ | 0.001 0.050 |
| 33 | 99.240 | 0.100 | 0.100 | 0.050 | $Ag_2O$ $Al_2O_3$ | 0.010 0.500 |
| 34 | 98.650 | 0.100 | 0.100 | 0.050 | $Ag_2O$ $Al_2O_3$ | 0.100 1.000 |
| 35 | 97.350 | 0.300 | 0.200 | 0.100 | $Ag_2O$ $Al_2O_3$ | 0.050 2.000 |
| 36 | 96.840 | 0.300 | 0.300 | 0.050 | $Ag_2O$ $Al_2O_3$ | 0.010 2.500 |
| 37* | 95.800 | 0.500 | 0.200 | 0.100 | $Ag_2O$ $Al_2O_3$ | 0.200 3.200 |

Marked * are comparison examples which are outside the claimed scope.

The above-mentioned starting material is mixed, press-formed and fired in the same condition way and conditions as of EXAMPLE 1 to make the similar element as that of EXAMPLE 1. The characteristics of the element are measured in the same way as that of EXAMPLE 1, and the measured results are shown in Table 4.

TABLE 4

| Sample No. | $V_{1mA/mm}$(V) | α | ε | tan δ (%) |
|---|---|---|---|---|
| 1* | 85.0 | 1.3 | $1.0 \times 10^6$ | 90.9 |
| 2* | 86.9 | 1.8 | $1.4 \times 10^6$ | 84.5 |
| 3* | 84.5 | 2.0 | $1.2 \times 10^6$ | 82.0 |
| 4* | 103.0 | 2.9 | $7.5 \times 10^5$ | 80.0 |
| 5* | 112.1 | 3.8 | $1.0 \times 10^5$ | 71.8 |
| 6* | 57.4 | 4.7 | $1.6 \times 10^4$ | 9.2 |
| 7 | 38.2 | 7.2 | $3.3 \times 10^4$ | 3.9 |
| 8 | 36.3 | 7.3 | $3.8 \times 10^4$ | 3.3 |
| 9 | 33.8 | 7.8 | $4.5 \times 10^4$ | 3.2 |
| 10 | 37.7 | 8.0 | $4.8 \times 10^4$ | 3.1 |
| 11* | 61.9 | 5.7 | $7.0 \times 10^4$ | 10.0 |
| 12 | 44.4 | 7.7 | $4.5 \times 10^4$ | 3.9 |
| 13 | 45.7 | 7.9 | $5.0 \times 10^4$ | 3.8 |
| 14 | 60.4 | 8.1 | $4.3 \times 10^4$ | 3.7 |
| 15 | 71.3 | 9.2 | $3.9 \times 10^4$ | 3.2 |
| 16* | 235.3 | 8.1 | $2.8 \times 10^3$ | 1.9 |
| 17 | 39.1 | 7.2 | $4.8 \times 10^4$ | 3.4 |
| 18 | 32.9 | 7.5 | $5.0 \times 10^4$ | 3.4 |
| 19 | 49.8 | 7.9 | $5.2 \times 10^4$ | 3.3 |
| 20 | 40.8 | 8.8 | $4.7 \times 10^4$ | 3.0 |
| 21 | 38.3 | 8.8 | $4.6 \times 10^4$ | 3.0 |
| 22 | 33.5 | 8.9 | $4.4 \times 10^4$ | 3.0 |
| 23 | 39.9 | 9.1 | $4.0 \times 10^4$ | 3.0 |
| 24 | 43.5 | 9.2 | $5.3 \times 10^4$ | 2.5 |
| 25 | 44.6 | 8.7 | $4.8 \times 10^4$ | 3.2 |
| 26 | 59.8 | 9.7 | $5.1 \times 10^4$ | 2.4 |
| 27 | 48.7 | 9.0 | $4.7 \times 10^4$ | 3.2 |
| 28 | 61.8 | 10.5 | $4.0 \times 10^4$ | 2.4 |
| 29 | 50.3 | 9.5 | $4.0 \times 10^4$ | 3.5 |
| 30 | 52.1 | 9.7 | $2.1 \times 10^4$ | 3.1 |
| 31* | 309.0 | 9.9 | $3.3 \times 10^3$ | 1.9 |
| 32 | 42.5 | 9.5 | $5.7 \times 10^4$ | 1.9 |
| 33 | 48.1 | 9.7 | $5.5 \times 10^4$ | 1.8 |
| 34 | 52.0 | 9.9 | $3.1 \times 10^4$ | 1.8 |
| 35 | 54.8 | 10.0 | $3.3 \times 10^4$ | 1.9 |
| 36 | 63.7 | 10.3 | $3.9 \times 10^4$ | 2.3 |
| 37* | 114.0 | 9.1 | $2.1 \times 10^3$ | 5.0 |

<EXAMPLE 3>

$SrCO_3$, $CaCO_3$ and $TiO_2$ are measured and blended in a manner to make $Sr_{0.9}Ca_{0.1}TiO_3$, and blended and grounded in a ball mill in a wet method for 15 hours. And the mixture is dried and ground, and then fired at 1200° C. for 3 hours, and further grounded thereby to prepare powder of $Sr_{0.9}Ca_{0.1}TiO_3$. Then, $Y_2O_3$, $Co_2O_3$, CuO, $Ag_2O$ and $Al_2O_3$ are measured added to the above-mentioned powder of $Sr_{0.9}Ca_{0.1}TiO_3$, in a manner to make the composition ratio shown Table 5.

TABLE 5

| Sample No. | First component $Sr_{0.9}Ca_{0.1}TiO_3$ (mol %) | Second component $Y_2O_3$ (mol %) | Third component $Co_2O_3$ (mol %) | Fourth component CuO (mol %) | Fifth component Additive | mol % |
|---|---|---|---|---|---|---|
| 1* | 99.999 | 0.001 | 0 | 0 | — | — |
| 2* | 99.900 | 0.100 | 0 | 0 | — | — |
| 3* | 99.000 | 1.000 | 0 | 0 | — | — |
| 4* | 98.000 | 2.000 | 0 | 0 | — | — |
| 5* | 97.000 | 3.000 | 0 | 0 | — | — |
| 6* | 99.998 | 0.001 | 0.001 | 0 | — | — |
| 7 | 99.889 | 0.100 | 0.010 | 0.001 | — | — |
| 8 | 99.199 | 0.300 | 0.500 | 0.001 | — | — |
| 9 | 97.999 | 1.000 | 1.000 | 0.001 | — | — |
| 10 | 96.499 | 1.500 | 2.000 | 0.001 | — | — |
| 11* | 95.499 | 1.500 | 3.000 | 0.001 | — | — |
| 12 | 99.988 | 0.001 | 0.001 | 0.001 | — | — |
| 13 | 99.889 | 0.010 | 0.001 | 0.100 | — | — |
| 14 | 99.489 | 0.010 | 0.001 | 0.500 | — | — |
| 15 | 97.999 | 1.000 | 0.001 | 1.000 | — | — |
| 16* | 96.999 | 1.000 | 0.001 | 2.000 | — | — |
| 17 | 99.700 | 0.100 | 0.100 | 0.100 | — | — |
| 18 | 99.300 | 0.100 | 0.300 | 0.300 | — | — |
| 19 | 98.600 | 0.100 | 0.300 | 1.000 | — | — |
| 20 | 98.600 | 0.100 | 1.000 | 0.300 | — | — |
| 21 | 97.700 | 0.300 | 1.500 | 0.500 | — | — |
| 22 | 97.200 | 1.000 | 1.000 | 0.800 | — | — |
| 23 | 96.000 | 2.000 | 1.000 | 1.000 | — | — |
| 24 | 99.699 | 0.100 | 0.100 | 0.100 | $Ag_2O$ | 0.001 |
| 25 | 99.699 | 0.100 | 0.100 | 0.100 | $Al_2O_3$ | 0.001 |
| 26 | 99.490 | 0.100 | 0.300 | 0.100 | $Ag_2O$ | 0.010 |
| 27 | 99.200 | 0.100 | 0.300 | 0.100 | $Al_2O_3$ | 0.300 |
| 28 | 98.250 | 0.300 | 0.300 | 0.150 | $Ag_2O$ | 1.000 |
| 29 | 97.150 | 0.500 | 0.300 | 0.050 | $Al_2O_3$ | 2.000 |
| 30 | 95.900 | 0.500 | 0.500 | 0.100 | $Al_2O_3$ | 3.000 |
| 31* | 94.950 | 0.800 | 0.700 | 0.050 | $Ag_2O$ | 3.500 |
| 32 | 99.699 | 0.100 | 0.100 | 0.050 | $Ag_2O$ $Al_2O_3$ | 0.001 0.050 |
| 33 | 99.240 | 0.100 | 0.100 | 0.050 | $Ag_2O$ $Al_2O_3$ | 0.010 0.500 |
| 34 | 98.650 | 0.100 | 0.100 | 0.050 | $Ag_2O$ $Al_2O_3$ | 0.100 1.000 |
| 35 | 97.350 | 0.300 | 0.200 | 0.100 | $Ag_2O$ $Al_2O_3$ | 0.050 2.000 |
| 36 | 96.840 | 0.300 | 0.300 | 0.050 | $Ag_2O$ $Al_2O_3$ | 0.010 2.500 |
| 37* | 95.800 | 0.500 | 0.200 | 0.100 | $Ag_2O$ $Al_2O_3$ | 0.200 3.200 |

Marked * are comparison examples which are outside the claimed scope.

The above-mentioned starting material is mixed, press-formed and fired in the same condition way and conditions as of EXAMPLE 1 to make the similar element as that of EXAMPLE 1. The characteristics of the element are measured in the same way as that of EXAMPLE 1, and the measured results are shown in Table 6.

TABLE 6

| Sample No. | V1mA/mm(V) | α | ε | tan δ (%) |
|---|---|---|---|---|
| 1* | 82.0 | 1.3 | $1.1 \times 10^6$ | 99.0 |
| 2* | 85.0 | 1.8 | $1.5 \times 10^6$ | 92.4 |
| 3* | 80.1 | 2.4 | $1.3 \times 10^6$ | 90.1 |
| 4* | 92.0 | 3.0 | $7.7 \times 10^5$ | 85.7 |
| 5* | 100.3 | 4.1 | $1.3 \times 10^5$ | 88.1 |
| 6* | 46.5 | 5.3 | $1.7 \times 10^4$ | 8.1 |
| 7 | 33.6 | 7.6 | $3.4 \times 10^4$ | 3.8 |
| 8 | 31.8 | 7.8 | $3.9 \times 10^4$ | 3.1 |
| 9 | 30.2 | 7.9 | $4.7 \times 10^4$ | 3.1 |
| 10 | 31.9 | 8.0 | $5.2 \times 10^4$ | 3.1 |
| 11* | 53.8 | 6.3 | $8.4 \times 10^4$ | 8.9 |
| 12 | 40.4 | 7.9 | $5.2 \times 10^4$ | 4.0 |
| 13 | 42.8 | 8.3 | $6.1 \times 10^4$ | 3.7 |
| 14 | 57.0 | 8.7 | $4.7 \times 10^4$ | 3.6 |
| 15 | 69.1 | 9.6 | $4.3 \times 10^4$ | 3.1 |
| 16* | 203.0 | 7.3 | $2.1 \times 10^3$ | 1.1 |
| 17 | 31.7 | 7.4 | $4.9 \times 10^4$ | 3.4 |
| 18 | 27.5 | 7.9 | $5.5 \times 10^4$ | 3.4 |
| 19 | 41.3 | 8.5 | $5.4 \times 10^4$ | 3.2 |
| 20 | 38.4 | 8.9 | $4.9 \times 10^4$ | 3.2 |
| 21 | 35.3 | 9.1 | $4.8 \times 10^4$ | 3.1 |
| 22 | 30.7 | 9.4 | $4.8 \times 10^4$ | 3.1 |
| 23 | 37.1 | 9.6 | $4.4 \times 10^4$ | 3.1 |
| 24 | 40.4 | 9.1 | $6.5 \times 10^4$ | 2.8 |
| 25 | 37.0 | 8.5 | $5.7 \times 10^4$ | 3.5 |
| 26 | 39.0 | 9.4 | $6.9 \times 10^4$ | 3.0 |
| 27 | 40.2 | 9.1 | $6.1 \times 10^4$ | 3.4 |
| 28 | 55.1 | 10.3 | $4.8 \times 10^4$ | 2.8 |
| 29 | 45.0 | 9.7 | $4.7 \times 10^4$ | 3.2 |
| 30 | 47.2 | 9.4 | $4.3 \times 10^4$ | 3.3 |
| 31* | 206.7 | 9.0 | $1.9 \times 10^3$ | 2.9 |
| 32 | 34.3 | 9.1 | $6.8 \times 10^4$ | 2.9 |
| 33 | 41.0 | 9.4 | $6.2 \times 10^4$ | 2.8 |
| 34 | 47.2 | 9.8 | $5.1 \times 10^4$ | 2.7 |
| 35 | 48.0 | 9.7 | $4.4 \times 10^4$ | 2.8 |
| 36 | 57.8 | 9.5 | $4.3 \times 10^4$ | 2.7 |
| 37* | 101.1 | 8.2 | $4.9 \times 10^4$ | 4.0 |

Marked * are comparison examples which are outside the claimed scope.

<EXAMPLE 4>

After measuring $SrCO_3$ and $TiO_2$ in a manner that $SrTiO_3$ having Sr/Ti atom ratio of 0.98 is obtained, and they are blended and ground for 12 hours in wet method in a ball-mill or the like and dried. Then, the mixture is again ground, and thereafter, the ground powder is press-formed into a disk of a size of 80 mm diameter and 50 mm thickness by a pressing force of 1.0 ton/cm². The press-formed body then is calcinated at 1200° C. for 4 hours, and further ground by a ball-mill or the like for about 20 hours, thereby to prepare a host material powder of $SrTiO_3$.

Next, $SrTiO_3$, $Y_2O_3$, $Co_2O_3$, CuO, $Ag_2O$ and $ZrO_2$, and further, one of $B_2O_3$, NiO, $MoO_3$, BeO, $Fe_2O_3$, $Al_2O_3$, $Li_2O$, $Cr_2O_3$, PbO, CaO, $TiO_2$, $P_2O_5$, $Sb_2O_3$, $V_2O_5$ are measured in a composition ratio shown in Table 7, and press-formed and fired in the same manner as EXAMPLE 1. And the resulted element was measured in the similar conditions as those of EXAMPLE 1, and the results are shown in Table 8.

TABLE 7

| Sample No. | Composition ratio (mol %) | | | | | | Additive | |
|---|---|---|---|---|---|---|---|---|
| | $SrTiO_3$ | $Y_2O_3$ | $Co_2O_3$ | CuO | $Ag_2O$ | $ZrO_2$ | | |
| 1* | 99.999 | 0.001 | — | — | — | — | — | |
| 2* | 99.998 | 0.001 | 0.001 | — | — | — | — | |
| 3* | 99.997 | 0.001 | 0.001 | 0.001 | — | — | — | |
| 4* | 99.996 | 0.001 | 0.001 | 0.001 | 0.001 | — | — | |
| 5 | 99.995 | 0.001 | 0.001 | 0.001 | 0.001 | 0.001 | — | |
| 6 | 99.986 | 0.010 | 0.001 | 0.001 | 0.001 | 0.001 | — | |
| 7 | 99.896 | 0.100 | 0.001 | 0.001 | 0.001 | 0.001 | — | |
| 8 | 98.996 | 1.000 | 0.001 | 0.001 | 0.001 | 0.001 | — | |
| 9 | 97.996 | 2.000 | 0.001 | 0.001 | 0.001 | 0.001 | — | |
| 10* | 95.996 | 4.000 | 0.001 | 0.001 | 0.001 | 0.001 | — | |
| 11 | 99.397 | 0.500 | 0.100 | 0.001 | 0.001 | 0.001 | — | |
| 12 | 98.497 | 0.500 | 1.000 | 0.001 | 0.001 | 0.001 | — | |
| 13 | 97.497 | 0.500 | 2.000 | 0.001 | 0.001 | 0.001 | — | |
| 14* | 95.497 | 0.500 | 4.000 | 0.001 | 0.001 | 0.001 | — | |
| 15 | 99.298 | 0.500 | 0.100 | 0.100 | 0.001 | 0.001 | — | |
| 16 | 98.398 | 0.500 | 0.100 | 1.000 | 0.001 | 0.001 | — | |
| 17* | 97.398 | 0.500 | 0.100 | 2.000 | 0.001 | 0.001 | — | |
| 18 | 99.199 | 0.500 | 0.100 | 0.100 | 0.100 | 0.001 | — | |
| 19 | 98.299 | 0.500 | 0.100 | 0.100 | 1.000 | 0.001 | — | |
| 20* | 97.299 | 0.500 | 0.100 | 0.100 | 2.000 | 0.001 | — | |
| 21 | 99.100 | 0.500 | 0.100 | 0.100 | 0.100 | 0.100 | — | |
| 22 | 98.200 | 0.500 | 0.100 | 0.100 | 0.100 | 1.000 | — | |
| 23* | 97.200 | 0.500 | 0.100 | 0.100 | 0.100 | 2.000 | — | |
| 24 | 98.899 | 0.500 | 0.100 | 0.100 | 0.100 | 0.300 | $B_2O_3$ | 0.001 |
| 25 | 98.899 | 0.500 | 0.100 | 0.100 | 0.100 | 0.300 | NiO | 0.001 |
| 26 | 98.800 | 0.500 | 0.100 | 0.100 | 0.100 | 0.300 | $MoO_3$ | 0.100 |
| 27 | 98.800 | 0.500 | 0.100 | 0.100 | 0.100 | 0.300 | $Fe_2O_3$ | 0.100 |
| 28 | 97.900 | 0.500 | 0.100 | 0.100 | 0.100 | 0.300 | $Al_2O_3$ | 1.000 |
| 29 | 97.900 | 0.500 | 0.100 | 0.100 | 0.100 | 0.300 | $Li_2O$ | 1.000 |
| 30 | 96.900 | 0.500 | 0.100 | 0.100 | 0.100 | 0.300 | CaO | 2.000 |
| 31 | 96.900 | 0.500 | 0.100 | 0.100 | 0.100 | 0.300 | $TiO_2$ | 2.000 |
| 32* | 94.900 | 0.500 | 0.100 | 0.100 | 0.100 | 0.300 | $B_2O_3$ | 4.000 |
| 33 | 98.790 | 0.500 | 0.100 | 0.100 | 0.100 | 0.300 | $B_2O_3$ $Fe_2O_3$ | 0.010 0.100 |
| 34 | 98.645 | 0.500 | 0.100 | 0.100 | 0.100 | 0.300 | $Al_2O_3$ $Li_2O$ CaO | 0.100 0.005 0.100 |

TABLE 7-continued

| Sample No. | Composition ratio (mol %) | | | | | | Additive | |
|---|---|---|---|---|---|---|---|---|
| | $SrTiO_3$ | $Y_2O_3$ | $Co_2O_3$ | CuO | $Ag_2O$ | $ZrO_2$ | | |
| 35 | 98.500 | 0.500 | 0.100 | 0.100 | 0.100 | 0.300 | $TiO_2$ | 0.050 |
| | | | | | | | $Cr_2O_3$ | 0.100 |
| 36 | 98.590 | 0.500 | 0.100 | 0.100 | 0.100 | 0.300 | BeO | 0.300 |
| | | | | | | | $MoO_3$ | 0.300 |
| 37 | 98.650 | 0.500 | 0.100 | 0.100 | 0.100 | 0.300 | $P_2O_5$ | 0.010 |
| | | | | | | | $Li_2O$ | 0.050 |
| | | | | | | | $Al_2O_3$ | 0.200 |
| 38* | 96.400 | 0.500 | 0.100 | 0.100 | 0.100 | 0.300 | NiO | 0.500 |
| | | | | | | | $Fe_2O_3$ | 1.000 |
| | | | | | | | CaO | 1.000 |

Marked * are comparison examples which are outside the claimed scope.

TABLE 8

| Sample No. | $V_{1mA}/mm$ (V) | $\alpha$ | $\epsilon$ | tan $\delta$ (%) |
|---|---|---|---|---|
| 1* | 83.0 | 1.3 | $1.0 \times 10^5$ | 94.0 |
| 2* | 50.6 | 6.0 | $1.9 \times 10^4$ | 7.4 |
| 3* | 35.2 | 6.2 | $3.1 \times 10^4$ | 6.0 |
| 4* | 39.7 | 6.5 | $4.0 \times 10^4$ | 5.4 |
| 5 | 50.1 | 7.7 | $5.0 \times 10^4$ | 3.0 |
| 6 | 48.7 | 7.6 | $5.2 \times 10^4$ | 2.9 |
| 7 | 45.9 | 7.8 | $5.4 \times 10^4$ | 2.8 |
| 8 | 60.0 | 8.0 | $5.3 \times 10^4$ | 3.0 |
| 9 | 75.5 | 8.5 | $4.2 \times 10^4$ | 2.9 |
| 10* | 195.0 | 10.7 | $1.1 \times 10^3$ | 2.9 |
| 11 | 54.0 | 8.1 | $4.9 \times 10^4$ | 3.1 |
| 12 | 47.2 | 8.0 | $5.0 \times 10^4$ | 3.0 |
| 13 | 44.5 | 8.0 | $5.7 \times 10^4$ | 3.2 |
| 14* | 56.2 | 4.7 | $7.0 \times 10^4$ | 14.7 |
| 15 | 53.4 | 7.6 | $3.9 \times 10^4$ | 2.9 |
| 16 | 88.7 | 8.4 | $3.8 \times 10^4$ | 2.7 |
| 17* | 203.1 | 10.5 | $1.6 \times 10^3$ | 1.1 |
| 18 | 60.5 | 8.3 | $4.0 \times 10^4$ | 3.3 |
| 19 | 89.7 | 11.0 | $3.1 \times 10^4$ | 3.0 |
| 20* | 601.2 | 13.2 | $1.0 \times 10^3$ | 0.9 |
| 21 | 52.7 | 7.6 | $5.9 \times 10^4$ | 2.7 |
| 22 | 84.7 | 9.2 | $4.3 \times 10^4$ | 2.6 |
| 23* | 89.5 | 5.1 | $2.9 \times 10^4$ | 12.7 |
| 24 | 55.0 | 9.4 | $3.8 \times 10^4$ | 2.8 |
| 25 | 47.2 | 9.3 | $4.9 \times 10^4$ | 2.6 |
| 26 | 50.3 | 9.5 | $5.0 \times 10^4$ | 2.7 |
| 27 | 71.5 | 9.5 | $5.0 \times 10^4$ | 2.6 |
| 28 | 85.4 | 10.2 | $4.1 \times 10^4$ | 2.8 |
| 29 | 79.0 | 10.2 | $4.0 \times 10^4$ | 2.8 |
| 30 | 98.1 | 10.2 | $4.1 \times 10^4$ | 2.9 |
| 31 | 90.4 | 10.3 | $1.0 \times 10^4$ | 2.7 |
| 32* | 207.6 | 3.8 | $1.0 \times 10^3$ | 7.9 |
| 33 | 59.7 | 9.1 | $4.0 \times 10^4$ | 2.9 |
| 34 | 75.2 | 9.3 | $4.1 \times 10^4$ | 2.6 |
| 35 | 77.1 | 10.1 | $4.2 \times 10^4$ | 2.5 |
| 36 | 40.5 | 9.2 | $4.5 \times 10^4$ | 3.1 |
| 37 | 63.3 | 9.8 | $3.9 \times 10^4$ | 3.0 |
| 38* | 259.0 | 10.4 | $1.1 \times 10^3$ | 1.1 |

Marked * are comparison examples which are outside the claimed scope.

<EXAMPLE 5>

After measuring $SrCO_3$ and $TiO_2$ in a manner that $SrTiO_3$ having Sr/Ti atom ratio of 0.98 is obtained, and they are blended and ground for 12 hours in wet method in a ball-mill or the like and dried. Then, the mixture is again ground, and thereafter, the ground powder is press-formed into a disk of a size of 80 mm diameter and 50 mm thickness by a pressing force of 1.0 ton/cm². The press-formed body then is calcined at 1200° C. for 4 hours, and further ground by a ball-mill or the like for about 20 hours, thereby to preparee a host material powder of $SrTiO_3$.

Next, $SrTiO_3$, $Y_2O_3$, $Co_2O_3$, CuO, $Ag_2O$ and BaO, and further, one of $B_2O_3$, NiO, $MoO_3$, BeO, $Fe_2O_3$, $Al_2O_3$, $Li_2O$, $Cr_2O_3$, PbO, CaO, $TiO_2$, $P_2O_5$, $Sb_2O_3$ and $V_2O_5$ are measured in a composition ratio shown in Table 9, and press-formed and fired in the same manner as EXAMPLE 1. And the resultant element was measured in the similar conditions as those of EXAMPLE 1, and the results are shown in Table 10.

TABLE 9

| Sample No. | Composition ratio (mol %) | | | | | | Additive | |
|---|---|---|---|---|---|---|---|---|
| | $SrTiO_3$ | $Y_2O_3$ | $Co_2O_3$ | CuO | $Ag_2O$ | BaO | | |
| 1* | 99.999 | 0.001 | — | — | — | — | — | |
| 2* | 99.998 | 0.001 | 0.001 | — | — | — | — | |
| 3* | 99.997 | 0.001 | 0.001 | 0.001 | — | — | — | |
| 4* | 99.996 | 0.001 | 0.001 | 0.001 | 0.001 | — | — | |
| 5 | 99.995 | 0.001 | 0.001 | 0.001 | 0.001 | 0.001 | — | |
| 6 | 99.986 | 0.010 | 0.001 | 0.001 | 0.001 | 0.001 | — | |
| 7 | 99.896 | 0.100 | 0.001 | 0.001 | 0.001 | 0.001 | — | |
| 8 | 98.996 | 1.000 | 0.001 | 0.001 | 0.001 | 0.001 | — | |
| 9 | 97.996 | 2.000 | 0.001 | 0.001 | 0.001 | 0.001 | — | |
| 10* | 95.996 | 4.000 | 0.001 | 0.001 | 0.001 | 0.001 | — | |
| 11 | 99.397 | 0.500 | 0.100 | 0.001 | 0.001 | 0.001 | — | |
| 12 | 98.497 | 0.500 | 1.000 | 0.001 | 0.001 | 0.001 | — | |
| 13 | 97.497 | 0.500 | 2.000 | 0.001 | 0.001 | 0.001 | — | |
| 14* | 95.497 | 0.500 | 4.000 | 0.001 | 0.001 | 0.001 | — | |
| 15 | 99.298 | 0.500 | 0.100 | 0.100 | 0.001 | 0.001 | — | |
| 16 | 98.398 | 0.500 | 0.100 | 1.000 | 0.001 | 0.001 | — | |
| 17* | 97.398 | 0.500 | 0.100 | 2.000 | 0.001 | 0.001 | — | |
| 18 | 99.199 | 0.500 | 0.100 | 0.100 | 0.100 | 0.001 | — | |
| 19 | 98.299 | 0.500 | 0.100 | 0.100 | 1.000 | 0.001 | — | |
| 20* | 97.299 | 0.500 | 0.100 | 0.100 | 2.000 | 0.001 | — | |
| 21 | 99.100 | 0.500 | 0.100 | 0.100 | 0.100 | 0.100 | — | |
| 22 | 98.200 | 0.500 | 0.100 | 0.100 | 0.100 | 1.000 | — | |
| 23* | 97.200 | 0.500 | 0.100 | 0.100 | 0.100 | 2.000 | — | |
| 24 | 98.899 | 0.500 | 0.100 | 0.100 | 0.100 | 0.300 | $B_2O_3$ | 0.001 |
| 25 | 98.899 | 0.500 | 0.100 | 0.100 | 0.100 | 0.300 | NiO | 0.001 |
| 26 | 98.800 | 0.500 | 0.100 | 0.100 | 0.100 | 0.300 | $MoO_3$ | 0.001 |
| 27 | 98.800 | 0.500 | 0.100 | 0.100 | 0.100 | 0.300 | $Fe_2O_3$ | 0.100 |
| 28 | 97.900 | 0.500 | 0.100 | 0.100 | 0.100 | 0.300 | $Al_2O_3$ | 1.000 |
| 29 | 97.900 | 0.500 | 0.100 | 0.100 | 0.100 | 0.300 | $Li_2O$ | 1.000 |
| 30 | 96.900 | 0.500 | 0.100 | 0.100 | 0.100 | 0.300 | CaO | 2.000 |
| 31 | 96.900 | 0.500 | 0.100 | 0.100 | 0.100 | 0.300 | $TiO_2$ | 2.000 |
| 32* | 94.900 | 0.500 | 0.100 | 0.100 | 0.100 | 0.300 | $B_2O_3$ | 4.000 |
| 33 | 98.790 | 0.500 | 0.100 | 0.100 | 0.100 | 0.300 | $B_2O_3$ | 0.010 |
| | | | | | | | $Fe_2O_3$ | 0.100 |
| 34 | 98.645 | 0.500 | 0.100 | 0.100 | 0.100 | 0.300 | $Al_2O_3$ | 0.100 |
| | | | | | | | $Li_2O$ | 0.005 |
| | | | | | | | CaO | 0.100 |
| | | | | | | | $TiO_2$ | 0.050 |
| 35 | 98.500 | 0.500 | 0.100 | 0.100 | 0.100 | 0.300 | $Fe_2O_3$ | 0.100 |
| | | | | | | | $V_2O_5$ | 0.300 |
| 36 | 98.590 | 0.500 | 0.100 | 0.100 | 0.100 | 0.300 | BeO | 0.300 |
| | | | | | | | $P_2O_5$ | 0.010 |
| 37 | 98.650 | 0.500 | 0.100 | 0.100 | 0.100 | 0.300 | $Cr_2O_3$ | 0.050 |
| | | | | | | | $TiO_2$ | 0.200 |
| 38* | 96.400 | 0.500 | 0.100 | 0.100 | 0.100 | 0.300 | $MoO_3$ | 0.500 |
| | | | | | | | $Sb_2O_3$ | 1.000 |
| | | | | | | | $Al_2O_3$ | 1.000 |

Marked * are comparison examples which are outside the claimed scope.

TABLE 10

| Sample No. | $V_{1mA}/mm$ (V) | $\alpha$ | $\epsilon$ | tan $\delta$ (%) |
|---|---|---|---|---|
| 1* | 83.0 | 1.3 | $1.0 \times 10^6$ | 94.0 |
| 2* | 50.6 | 6.0 | $1.9 \times 10^4$ | 7.4 |

TABLE 10-continued

| Sample No. | $V_1$ mA/mm (V) | α | ε | tan δ (%) |
|---|---|---|---|---|
| 3* | 35.2 | 6.2 | $3.1 \times 10^4$ | 6.0 |
| 4* | 39.7 | 6.5 | $4.0 \times 10^4$ | 5.4 |
| 5 | 40.0 | 7.2 | $6.5 \times 10^4$ | 3.1 |
| 6 | 37.8 | 7.1 | $6.6 \times 10^4$ | 3.0 |
| 7 | 39.5 | 7.3 | $6.9 \times 10^4$ | 3.0 |
| 8 | 51.1 | 7.6 | $6.7 \times 10^4$ | 3.0 |
| 9 | 60.7 | 8.4 | $5.8 \times 10^4$ | 3.0 |
| 10* | 158.9 | 10.1 | $1.2 \times 10^3$ | 3.0 |
| 11 | 44.2 | 7.9 | $5.8 \times 10^4$ | 3.1 |
| 12 | 39.3 | 7.9 | $6.4 \times 10^4$ | 3.1 |
| 13 | 35.6 | 8.0 | $7.3 \times 10^4$ | 3.1 |
| 14* | 45.3 | 4.1 | $8.4 \times 10^4$ | 16.2 |
| 15 | 45.4 | 7.3 | $5.3 \times 10^4$ | 2.9 |
| 16 | 78.1 | 8.1 | $5.1 \times 10^4$ | 2.8 |
| 17* | 185.3 | 10.2 | $1.3 \times 10^3$ | 1.5 |
| 18 | 50.9 | 8.0 | $5.5 \times 10^4$ | 3.5 |
| 19 | 77.9 | 10.6 | $4.9 \times 10^4$ | 3.0 |
| 20* | 420.2 | 11.9 | $1.1 \times 10^3$ | 1.0 |
| 21 | 40.5 | 7.2 | $6.4 \times 10^4$ | 2.9 |
| 22 | 75.3 | 8.9 | $5.7 \times 10^4$ | 2.9 |
| 23* | 80.9 | 4.6 | $3.0 \times 10^4$ | 16.4 |
| 24 | 47.5 | 9.2 | $4.5 \times 10^4$ | 3.0 |
| 25 | 39.3 | 9.3 | $4.9 \times 10^4$ | 2.9 |
| 26 | 40.4 | 9.3 | $5.8 \times 10^4$ | 2.9 |
| 27 | 65.2 | 9.3 | $6.1 \times 10^4$ | 2.8 |
| 28 | 74.9 | 10.0 | $5.7 \times 10^4$ | 2.8 |
| 29 | 69.8 | 10.1 | $5.5 \times 10^4$ | 2.9 |
| 30 | 89.4 | 10.2 | $5.5 \times 10^4$ | 2.8 |
| 31 | 80.8 | 10.3 | $1.4 \times 10^4$ | 2.8 |
| 32* | 157.6 | 3.7 | $1.0 \times 10^3$ | 9.1 |
| 33 | 42.0 | 9.0 | $5.2 \times 10^4$ | 3.0 |
| 34 | 69.2 | 9.1 | $5.3 \times 10^4$ | 2.9 |
| 35 | 69.9 | 9.8 | $5.7 \times 10^4$ | 2.4 |
| 36 | 35.3 | 9.0 | $5.1 \times 10^4$ | 3.1 |
| 37 | 57.8 | 9.4 | $4.3 \times 10^4$ | 3.1 |
| 38* | 191.6 | 10.1 | $1.0 \times 10^3$ | 1.7 |

Marked * are comparison examples which are outside the claimed scope.

<EXAMPLE 6>

After measuring $SrCO_3$ and $TiO_2$ in a manner that $SrTiO_3$ having Sr/Ti atom ratio of 0.98 is obtained, and they are blended and ground for 12 hours in wet method in a ball-mill or the like and dried. Then, the mixture is again ground, and thereafter, the ground powder is press-formed into a disk of a size of 80 mm diameter and 50 mm thickness by a pressing force of 1.0 ton/cm². The press-formed body than is calcinated at 1200° C. for 4 hours, and further ground by a ball-mill or the like for about 20 hours, thereby to prepare a host material powder of $SrTiO_3$.

Next, $SrTiO_3$, $Y_2O_3$, $Co_2O_3$, CuO, $Ag_2O$ and $SiO_2$, and further, one of $B_2O_3$, $MnO_2$, NiO, $MoO_3$, BeO, $Fe_2O_3$, $Al_2O_3$, $Li_2O$, $Cr_2O_3$, $ZrO_2$, PbO, BaO, CaO, MgO, $TiO_2$, ZnO, $P_2O_5$, $Sb_2O_3$ and $V_2O_5$ are measured in a composition ratio shown in Table 11, and press-formed and fired in the same manner as EXAMPLE 1. And the resultant element was measured in the similar conditions as those of EXAMPLE 1, and the results are shown in Table 12.

TABLE 11

| Sample No. | Composition ratio (mol %) | | | | | | Additive | |
|---|---|---|---|---|---|---|---|---|
| | $SrTiO_3$ | $Y_2O_3$ | $Co_2O_3$ | CuO | $Ag_2O$ | $SiO_2$ | | |
| 1* | 99.999 | 0.001 | — | — | — | — | — | |
| 2* | 99.998 | 0.001 | 0.001 | — | — | — | — | |
| 3* | 99.997 | 0.001 | 0.001 | 0.001 | — | — | — | |
| 4* | 99.996 | 0.001 | 0.001 | 0.001 | 0.001 | — | — | |
| 5 | 99.995 | 0.001 | 0.001 | 0.001 | 0.001 | 0.001 | — | |
| 6 | 99.986 | 0.010 | 0.001 | 0.001 | 0.001 | 0.001 | — | |
| 7 | 99.896 | 0.100 | 0.001 | 0.001 | 0.001 | 0.001 | — | |
| 8 | 98.996 | 1.000 | 0.001 | 0.001 | 0.001 | 0.001 | — | |
| 9 | 97.996 | 2.000 | 0.001 | 0.001 | 0.001 | 0.001 | — | |
| 10* | 95.996 | 4.000 | 0.001 | 0.001 | 0.001 | 0.001 | — | |
| 11 | 99.397 | 0.500 | 0.100 | 0.001 | 0.001 | 0.001 | — | |
| 12 | 98.497 | 0.500 | 1.000 | 0.001 | 0.001 | 0.001 | — | |
| 13 | 97.497 | 0.500 | 2.000 | 0.001 | 0.001 | 0.001 | — | |
| 14* | 95.497 | 0.500 | 4.000 | 0.001 | 0.001 | 0.001 | — | |
| 15 | 99.298 | 0.500 | 0.100 | 0.100 | 0.001 | 0.001 | — | |
| 16 | 98.398 | 0.500 | 0.100 | 1.000 | 0.001 | 0.001 | — | |
| 17* | 97.398 | 0.500 | 0.100 | 2.000 | 0.001 | 0.001 | — | |
| 18 | 99.199 | 0.500 | 0.100 | 0.100 | 0.100 | 0.001 | — | |
| 19 | 98.299 | 0.500 | 0.100 | 0.100 | 1.000 | 0.001 | — | |
| 20* | 97.299 | 0.500 | 0.100 | 0.100 | 2.000 | 0.001 | — | |
| 21 | 99.100 | 0.500 | 0.100 | 0.100 | 0.100 | 0.100 | — | |
| 22 | 98.200 | 0.500 | 0.100 | 0.100 | 0.100 | 1.000 | — | |
| 23* | 97.200 | 0.500 | 0.100 | 0.100 | 0.100 | 2.000 | — | |
| 24 | 98.899 | 0.500 | 0.100 | 0.100 | 0.100 | 0.300 | $B_2O_3$ | 0.001 |
| 25 | 98.899 | 0.500 | 0.100 | 0.100 | 0.100 | 0.300 | NiO | 0.001 |
| 26 | 98.800 | 0.500 | 0.100 | 0.100 | 0.100 | 0.300 | $MoO_3$ | 0.100 |
| 27 | 98.800 | 0.500 | 0.100 | 0.100 | 0.100 | 0.300 | $Fe_2O_3$ | 0.100 |
| 28 | 97.900 | 0.500 | 0.100 | 0.100 | 0.100 | 0.300 | $Al_2O_3$ | 1.000 |
| 29 | 97.900 | 0.500 | 0.100 | 0.100 | 0.100 | 0.300 | $Li_2O$ | 1.000 |
| 30 | 96.900 | 0.500 | 0.100 | 0.100 | 0.100 | 0.300 | CaO | 2.000 |
| 31 | 96.900 | 0.500 | 0.100 | 0.100 | 0.100 | 0.300 | $TiO_2$ | 2.000 |
| 32* | 94.900 | 0.500 | 0.100 | 0.100 | 0.100 | 0.300 | $B_2O_3$ | 4.000 |
| 33 | 98.790 | 0.500 | 0.100 | 0.100 | 0.100 | 0.300 | $B_2O_3$ | 0.010 |
| | | | | | | | $Fe_2O_3$ | 0.100 |
| 34 | 98.645 | 0.500 | 0.100 | 0.100 | 0.100 | 0.300 | $Al_2O_3$ | 0.100 |
| | | | | | | | $Li_2O$ | 0.005 |
| | | | | | | | CaO | 0.100 |
| | | | | | | | $TiO_2$ | 0.050 |
| 35 | 98.500 | 0.500 | 0.100 | 0.100 | 0.100 | 0.300 | $MnO_2$ | 0.100 |
| | | | | | | | $Al_2O_3$ | 0.300 |
| 36 | 98.887 | 0.500 | 0.100 | 0.100 | 0.100 | 0.300 | BaO | 0.010 |
| | | | | | | | $Li_2O$ | 0.003 |
| 37 | 98.500 | 0.500 | 0.100 | 0.100 | 0.100 | 0.300 | $Al_2O_3$ | 0.100 |
| | | | | | | | MgO | 0.300 |
| 38 | 98.400 | 0.500 | 0.100 | 0.100 | 0.100 | 0.300 | $TiO_2$ | 0.050 |
| | | | | | | | $ZrO_2$ | 0.150 |
| | | | | | | | $MnO_2$ | 0.300 |
| 39* | 96.390 | 0.500 | 0.100 | 0.100 | 0.100 | 0.300 | MgO | 1.500 |
| | | | | | | | $MnO_2$ | 1.000 |
| | | | | | | | $TiO_2$ | 0.010 |

Marked * are comparison examples which are outside the claimed scope.

<TABLE 12>

| Sample No. | $V_1$ mA/mm (V) | α | ε | δ (%) |
|---|---|---|---|---|
| 1* | 83.0 | 1.3 | $1.0 \times 10^6$ | 91.0 |
| 2* | 50.6 | 6.0 | $1.9 \times 10^4$ | 7.4 |
| 3* | 35.2 | 6.2 | $3.1 \times 10^4$ | 6.0 |
| 4* | 39.7 | 6.5 | $4.0 \times 10^4$ | 5.4 |
| 5 | 43.2 | 7.8 | $6.2 \times 10^4$ | 3.1 |
| 6 | 41.9 | 7.6 | $6.3 \times 10^4$ | 3.3 |
| 7 | 40.0 | 7.7 | $6.5 \times 10^4$ | 3.3 |
| 8 | 52.4 | 7.9 | $5.7 \times 10^4$ | 3.1 |
| 9 | 70.1 | 8.8 | $5.3 \times 10^4$ | 2.7 |
| 10* | 155.0 | 9.7 | $2.0 \times 10^3$ | 2.2 |
| 11 | 40.9 | 7.8 | $5.3 \times 10^4$ | 3.2 |
| 12 | 37.3 | 7.7 | $5.5 \times 10^4$ | 3.7 |
| 13 | 38.7 | 7.1 | $6.1 \times 10^4$ | 4.3 |
| 14* | 45.1 | 5.7 | $8.0 \times 10^4$ | 28.9 |
| 15 | 47.2 | 7.2 | $4.3 \times 10^4$ | 3.1 |
| 16 | 89.0 | 8.9 | $4.1 \times 10^4$ | 2.4 |
| 17* | 304.9 | 11.4 | $1.9 \times 10^3$ | 1.0 |
| 18 | 52.3 | 8.0 | $4.5 \times 10^4$ | 2.8 |
| 19 | 94.0 | 10.9 | $4.1 \times 10^4$ | 2.3 |
| 20* | 909.4 | 15.3 | $1.1 \times 10^3$ | 0.9 |
| 21 | 49.7 | 8.0 | $6.3 \times 10^4$ | 3.0 |
| 22 | 80.5 | 9.4 | $5.1 \times 10^4$ | 2.7 |
| 23* | 84.9 | 6.9 | $2.8 \times 10^4$ | 11.5 |
| 24 | 51.3 | 9.7 | $3.9 \times 10^4$ | 3.2 |
| 25 | 40.9 | 9.2 | $5.3 \times 10^4$ | 3.5 |
| 26 | 43.4 | 9.5 | $5.5 \times 10^4$ | 3.4 |
| 27 | 62.1 | 9.5 | $4.7 \times 10^4$ | 2.7 |
| 28 | 75.5 | 10.1 | $4.2 \times 10^4$ | 2.4 |
| 29 | 74.0 | 10.0 | $4.3 \times 10^4$ | 2.1 |

TABLE 12 -continued

| Sample No. | $V_1$ mA/mm (V) | $\alpha$ | $\epsilon$ | $\delta(\%)$ |
|---|---|---|---|---|
| 30 | 97.1 | 10.3 | $3.8 \times 10^4$ | 2.2 |
| 31 | 88.8 | 10.5 | $3.5 \times 10^4$ | 2.3 |
| 32* | 210.4 | 4.1 | $1.7 \times 10^3$ | 3.9 |
| 33 | 55.1 | 9.1 | $4.3 \times 10^4$ | 2.2 |
| 34 | 70.8 | 9.7 | $5.0 \times 10^4$ | 2.0 |
| 35 | 75.0 | 10.9 | $4.9 \times 10^4$ | 2.0 |
| 36 | 54.0 | 9.2 | $5.7 \times 10^4$ | 2.9 |
| 37 | 64.3 | 9.5 | $5.5 \times 10^4$ | 2.7 |
| 38 | 102.5 | 10.8 | $3.9 \times 10^4$ | 1.5 |
| 39* | 899.0 | 16.5 | $1.0 \times 10^3$ | 0.8 |

Marked * are comparison examples which are outside the claimed scope.

<EXAMPLE 7>

After measuring $SrCO_3$ and $TiO_2$ in a manner that $SrTiO_3$ having Sr/Ti atom ratio of 0.98 is obtained, and they are blended and ground for 12 hours in wet method in a ball-mill or the like and dried. Then, the mixture is again ground, and thereafter, the ground powder is press-formed into a disk of a size of 80 mm diameter and 50 mm thickness by a pressing force of 1.0 ton/cm². The press-formed body then is calcinated at 1200° C. for 4 hours, and further ground by a ball-mill or the like for about 20 hours, thereby to prepare a host material powder of $SrTiO_3$.

Next, $SrTiO_3$, $Y_2O_3$, $Co_2O_3$, CuO, $Ag_2O$ and $SiO_2$, and further, one of $B_2O_3$, $MnO_2$, NiO, $MoO_3$, BeO, $Fe_2O_3$, $Al_2O_3$, $Li_2O$, $Cr_2O_3$, $ZrO_2$, PbO, BaO, CaO, MgO, $TiO_2$, ZnO, $P_2O_5$, $Sb_2O_3$ and $V_2O_5$ are measured in a composition ratio shown in Table 13, and press-formed and fired in the same manner as EXAMPLE 1. And the resultant element was measured in the similar conditions as those of EXAMPLE 1, and the results are shown in Table 14.

<TABLE 13>

| Sample No. | SrTiO₃ | Y₂O₃ | Co₂O₃ | CuO | Ag₂O | MgO | Additive |
|---|---|---|---|---|---|---|---|
| 1* | 99.999 | 0.001 | — | — | — | — | — |
| 2* | 99.998 | 0.001 | 0.001 | — | — | — | — |
| 3* | 99.997 | 0.001 | 0.001 | 0.001 | — | — | — |
| 4* | 99.996 | 0.001 | 0.001 | 0.001 | 0.001 | — | — |
| 5 | 99.995 | 0.001 | 0.001 | 0.001 | 0.001 | 0.001 | — |
| 6 | 99.986 | 0.010 | 0.001 | 0.001 | 0.001 | 0.001 | — |
| 7 | 99.896 | 0.100 | 0.001 | 0.001 | 0.001 | 0.001 | — |
| 8 | 98.996 | 1.000 | 0.001 | 0.001 | 0.001 | 0.001 | — |
| 9 | 97.996 | 2.000 | 0.001 | 0.001 | 0.001 | 0.001 | — |
| 10* | 95.996 | 4.000 | 0.001 | 0.001 | 0.001 | 0.001 | — |
| 11 | 99.397 | 0.500 | 0.100 | 0.001 | 0.001 | 0.001 | — |
| 12 | 98.497 | 0.500 | 1.000 | 0.001 | 0.001 | 0.001 | — |
| 13 | 97.497 | 0.500 | 2.000 | 0.001 | 0.001 | 0.001 | — |
| 14* | 95.497 | 0.500 | 4.000 | 0.001 | 0.001 | 0.001 | — |
| 15 | 99.298 | 0.500 | 0.100 | 0.100 | 0.001 | 0.001 | — |
| 16 | 98.398 | 0.500 | 0.100 | 1.000 | 0.001 | 0.001 | — |
| 17* | 97.398 | 0.500 | 0.100 | 2.000 | 0.001 | 0.001 | — |
| 18 | 99.199 | 0.500 | 0.100 | 0.100 | 0.100 | 0.001 | — |
| 19 | 98.299 | 0.500 | 0.100 | 0.100 | 1.000 | 0.001 | — |
| 20* | 97.299 | 0.500 | 0.100 | 0.100 | 2.000 | 0.001 | — |
| 21 | 99.100 | 0.500 | 0.100 | 0.100 | 0.100 | 0.100 | — |
| 22 | 98.200 | 0.500 | 0.100 | 0.100 | 0.100 | 1.000 | — |
| 23* | 97.200 | 0.500 | 0.100 | 0.100 | 0.100 | 2.000 | — |
| 24 | 98.899 | 0.500 | 0.100 | 0.100 | 0.100 | 0.300 | B₂O₃ 0.001 |
| 25 | 98.899 | 0.500 | 0.100 | 0.100 | 0.100 | 0.300 | NiO 0.001 |
| 26 | 98.800 | 0.500 | 0.100 | 0.100 | 0.100 | 0.300 | MoO₃ 0.100 |
| 27 | 98.800 | 0.500 | 0.100 | 0.100 | 0.100 | 0.300 | Fe₂O₃ 0.100 |
| 28 | 97.900 | 0.500 | 0.100 | 0.100 | 0.100 | 0.300 | Al₂O₃ 1.000 |
| 29 | 97.900 | 0.500 | 0.100 | 0.100 | 0.100 | 0.300 | Li₂O 1.000 |
| 30 | 96.900 | 0.500 | 0.100 | 0.100 | 0.100 | 0.300 | CaO 2.000 |
| 31 | 96.900 | 0.500 | 0.100 | 0.100 | 0.100 | 0.300 | TiO₂ 2.000 |
| 32* | 94.900 | 0.500 | 0.100 | 0.100 | 0.100 | 0.300 | B₂O₃ 4.000 |
| 33 | 98.790 | 0.500 | 0.100 | 0.100 | 0.100 | 0.300 | B₂O₃ 0.010 |
| 34 | 98.645 | 0.500 | 0.100 | 0.100 | 0.100 | 0.300 | Fe₂O₃ 0.100<br>Al₂O₃ 0.100<br>Li₂O 0.005<br>CaO 0.100<br>TiO₂ 0.050 |
| 35 | 98.300 | 0.500 | 0.100 | 0.100 | 0.100 | 0.300 | V₂O₅ 0.100<br>CaO 0.500 |
| 36 | 98.350 | 0.500 | 0.100 | 0.100 | 0.100 | 0.300 | Sb₂O₃ 0.050<br>TiO₂ 0.500 |
| 37 | 98.100 | 0.500 | 0.100 | 0.100 | 0.100 | 0.300 | NiO 0.300<br>Al₂O₃ 0.500 |
| 38* | 96.795 | 0.500 | 0.100 | 0.100 | 0.100 | 0.300 | BeO 0.005<br>Cr₂O₃ 1.100<br>CaO 1.000 |

Marked * are comparison examples which are outside the claimed scope.

TABLE 14

| Sample No. | $V_1$ mA/mm (V) | $\alpha$ | $\epsilon$ | $\tan\delta$ (%) |
|---|---|---|---|---|
| 1* | 83.0 | 1.3 | $1.0 \times 10^6$ | 94.0 |
| 2* | 50.6 | 6.0 | $1.9 \times 10^4$ | 7.4 |
| 3* | 35.2 | 6.2 | $3.1 \times 10^4$ | 6.0 |
| 4* | 39.7 | 6.5 | $4.0 \times 10^4$ | 5.4 |
| 5 | 48.1 | 7.5 | $4.9 \times 10^4$ | 2.9 |
| 6 | 46.5 | 7.7 | $5.1 \times 10^4$ | 2.8 |
| 7 | 43.8 | 7.8 | $5.2 \times 10^4$ | 2.7 |
| 8 | 55.7 | 8.1 | $5.3 \times 10^4$ | 2.9 |
| 9 | 73.6 | 8.4 | $4.3 \times 10^4$ | 2.8 |
| 10* | 181.0 | 9.8 | $1.0 \times 10^3$ | 2.8 |
| 11 | 51.5 | 8.2 | $4.8 \times 10^4$ | 2.8 |
| 12 | 45.3 | 8.2 | $5.1 \times 10^4$ | 2.8 |
| 13 | 41.6 | 8.1 | $5.6 \times 10^4$ | 2.9 |
| 14* | 55.0 | 4.4 | $6.1 \times 10^4$ | 11.5 |
| 15 | 52.2 | 7.7 | $4.2 \times 10^4$ | 2.7 |
| 16 | 87.8 | 8.3 | $4.1 \times 10^4$ | 2.5 |
| 17* | 180.5 | 10.2 | $1.3 \times 10^3$ | 0.7 |
| 18 | 58.3 | 8.1 | $4.2 \times 10^4$ | 2.9 |
| 19 | 87.7 | 10.7 | $3.9 \times 10^4$ | 2.9 |
| 20* | 349.1 | 12.9 | $1.1 \times 10^3$ | 0.9 |
| 21 | 50.5 | 7.2 | $5.7 \times 10^4$ | 2.5 |
| 22 | 82.2 | 9.0 | $4.1 \times 10^4$ | 2.4 |
| 23* | 85.8 | 5.2 | $1.9 \times 10^4$ | 11.9 |
| 24 | 54.1 | 9.2 | $3.9 \times 10^4$ | 1.8 |
| 25 | 42.3 | 9.3 | $4.7 \times 10^4$ | 1.4 |
| 26 | 47.8 | 9.4 | $4.9 \times 10^4$ | 1.7 |
| 27 | 65.6 | 9.5 | $5.0 \times 10^4$ | 1.8 |
| 28 | 80.5 | 10.0 | $4.2 \times 10^4$ | 1.5 |
| 29 | 66.3 | 10.0 | $4.1 \times 10^4$ | 1.7 |
| 30 | 93.4 | 10.1 | $4.1 \times 10^4$ | 1.4 |
| 31 | 84.4 | 10.0 | $1.0 \times 10^4$ | 1.4 |
| 32* | 172.3 | 2.4 | $1.0 \times 10^3$ | 9.5 |
| 33 | 57.2 | 9.0 | $4.1 \times 10^4$ | 2.0 |
| 34 | 81.8 | 9.2 | $4.1 \times 10^4$ | 1.7 |
| 35 | 55.3 | 10.2 | $4.4 \times 10^4$ | 1.8 |
| 36 | 70.4 | 10.3 | $4.7 \times 10^4$ | 1.4 |
| 37 | 78.5 | 10.5 | $4.3 \times 10^4$ | 1.4 |
| 38* | 241.9 | 11.7 | $1.1 \times 10^3$ | 0.9 |

Marked * are comparison examples which are outside the claimed scope.

<EXAMPLE 8>

After measuring $SrCO_3$ and $TiO_2$ in a manner that $SrTiO_3$ having Sr/Ti atom ratio of 0.98 is obtained, and they are blended and ground for 12 hours in wet method in a ball-mill or the like and dried. Then, the mixture is again ground, and thereafter, the ground powder is press-formed into a disk of a size of 80 mm diameter and 50 mm thickness by a pressing force of 1.0 ton/cm². The press-formed body then is calcinated at 1200° C. for 4 hours, and further ground by a ball-mill or the like for about 20 hours, thereby to prepare a host material powder of $SrTiO_3$.

Next, $SrTiO_3$, $Y_2O_3$, $Co_2O_3$, $CuO$, $Ag_2O$ and $MnO_2$, and further, one of $B_2O_3$, $NiO$, $MoO_3$, $BeO$, $Fe_2O_3$, $Al_2O_3$, $Li_2O$, $Cr_2O_3$, $PbO$, $CaO$, $TiO_2$, $P_2O_5$, $Sb_2O_3$ and $V_2O_5$ are measured in a composition ratio shown in Table 15, and press-formed and fired in the same manner as EXAMPLE 1. And the resultant element was measured in the similar conditions as those of EXAMPLE 1, and the results are shown in Table 16.

<TABLE 15>

| Sample No. | SrTiO₃ | Y₂O₃ | Co₂O₃ | CuO | Ag₂O | MnO₂ | Additive |
|---|---|---|---|---|---|---|---|
| 1* | 99.999 | 0.001 | — | — | — | — | — |
| 2* | 99.998 | 0.001 | 0.001 | — | — | — | — |
| 3* | 99.997 | 0.001 | 0.001 | 0.001 | — | — | — |
| 4* | 99.996 | 0.001 | 0.001 | 0.001 | 0.001 | — | — |
| 5 | 99.995 | 0.001 | 0.001 | 0.001 | 0.001 | 0.001 | — |
| 6 | 99.986 | 0.010 | 0.001 | 0.001 | 0.001 | 0.001 | — |
| 7 | 99.896 | 0.100 | 0.001 | 0.001 | 0.001 | 0.001 | — |
| 8 | 98.996 | 1.000 | 0.001 | 0.001 | 0.001 | 0.001 | — |
| 9 | 97.996 | 2.000 | 0.001 | 0.001 | 0.001 | 0.001 | — |
| 10* | 95.996 | 4.000 | 0.001 | 0.001 | 0.001 | 0.001 | — |
| 11 | 99.397 | 0.500 | 0.100 | 0.001 | 0.001 | 0.001 | — |
| 12 | 98.497 | 0.500 | 1.000 | 0.001 | 0.001 | 0.001 | — |
| 13 | 97.497 | 0.500 | 2.000 | 0.001 | 0.001 | 0.001 | — |
| 14* | 95.497 | 0.500 | 4.000 | 0.001 | 0.001 | 0.001 | — |
| 15 | 99.298 | 0.500 | 0.100 | 0.100 | 0.001 | 0.001 | — |
| 16 | 98.398 | 0.500 | 0.100 | 1.000 | 0.001 | 0.001 | — |
| 17* | 97.398 | 0.500 | 0.100 | 2.000 | 0.001 | 0.001 | — |
| 18 | 99.199 | 0.500 | 0.100 | 0.100 | 0.100 | 0.001 | — |
| 19 | 98.299 | 0.500 | 0.100 | 0.100 | 1.000 | 0.001 | — |
| 20* | 97.299 | 0.500 | 0.100 | 0.100 | 2.000 | 0.001 | — |
| 21 | 99.100 | 0.500 | 0.100 | 0.100 | 0.100 | 0.100 | — |
| 22 | 98.200 | 0.500 | 0.100 | 0.100 | 0.100 | 1.000 | — |
| 23* | 97.200 | 0.500 | 0.100 | 0.100 | 0.100 | 2.000 | — |
| 24 | 98.899 | 0.500 | 0.100 | 0.100 | 0.100 | 0.300 | B₂O₃ 0.001 |
| 25 | 98.899 | 0.500 | 0.100 | 0.100 | 0.100 | 0.300 | NiO 0.001 |
| 26 | 98.800 | 0.500 | 0.100 | 0.100 | 0.100 | 0.300 | MoO₃ 0.100 |
| 27 | 98.800 | 0.500 | 0.100 | 0.100 | 0.100 | 0.300 | Fe₂O₃ 0.100 |
| 28 | 97.900 | 0.500 | 0.100 | 0.100 | 0.100 | 0.300 | Al₂O₃ 1.000 |
| 29 | 97.900 | 0.500 | 0.100 | 0.100 | 0.100 | 0.300 | Li₂O 1.000 |
| 30 | 96.900 | 0.500 | 0.100 | 0.100 | 0.100 | 0.300 | CaO 2.000 |
| 31 | 96.900 | 0.500 | 0.100 | 0.100 | 0.100 | 0.300 | TiO₂ 2.000 |
| 32* | 94.900 | 0.500 | 0.100 | 0.100 | 0.100 | 0.300 | B₂O₃ 4.000 |
| 33 | 98.790 | 0.500 | 0.100 | 0.100 | 0.100 | 0.300 | B₂O₃ 0.100 Fe₂O₃ 0.100 |
| 34 | 98.645 | 0.500 | 0.100 | 0.100 | 0.100 | 0.300 | Al₂O₃ 0.100 Li₂O 0.005 CaO 0.100 TiO₂ 0.050 |
| 35 | 98.500 | 0.500 | 0.100 | 0.100 | 0.100 | 0.300 | MoO₃ 0.100 CaO 0.300 |
| 36 | 98.887 | 0.500 | 0.100 | 0.100 | 0.100 | 0.300 | PbO 0.010 Al₂O₃ 0.300 |
| 37 | 98.445 | 0.500 | 0.100 | 0.100 | 0.100 | 0.300 | Fe₂O₃ 0.005 Cr₂O₃ 0.150 TiO₂ 0.300 |
| 38* | 96.300 | 0.500 | 0.100 | 0.100 | 0.100 | 0.300 | BeO 0.100 Li₂O 1.000 CaO 1.500 |

Marked * are comparison examples which are outside the claimed scope.

TABLE 16

| Sample No. | V₁ mA/mm (V) | α | ε | tan δ (%) |
|---|---|---|---|---|
| 1* | 83.0 | 1.3 | 1.0 × 10⁶ | 94.0 |
| 2* | 50.6 | 6.0 | 1.9 × 10⁴ | 7.4 |
| 3* | 35.2 | 6.2 | 3.1 × 10⁴ | 6.0 |
| 4* | 39.7 | 6.5 | 4.0 × 10⁴ | 5.4 |
| 5 | 55.3 | 8.0 | 6.0 × 10⁴ | 3.5 |
| 6 | 53.9 | 8.7 | 6.1 × 10⁴ | 3.4 |
| 7 | 50.5 | 8.9 | 6.4 × 10⁴ | 3.6 |
| 8 | 64.2 | 9.1 | 5.6 × 10⁴ | 3.3 |
| 9 | 80.5 | 9.9 | 4.8 × 10⁴ | 3.2 |
| 10* | 209.4 | 10.5 | 1.5 × 10³ | 3.1 |
| 11 | 59.0 | 9.1 | 5.2 × 10⁴ | 3.4 |
| 12 | 48.7 | 8.9 | 5.3 × 10⁴ | 3.5 |
| 13 | 48.8 | 8.5 | 5.9 × 10⁴ | 4.4 |
| 14* | 55.9 | 5.5 | 7.5 × 10⁴ | 30.4 |
| 15 | 58.2 | 7.4 | 4.5 × 10⁴ | 3.0 |
| 16 | 100.0 | 8.9 | 3.9 × 10⁴ | 2.8 |
| 17* | 341.3 | 12.0 | 1.7 × 10³ | 0.9 |
| 18 | 63.4 | 8.5 | 4.0 × 10⁴ | 3.3 |
| 19 | 100.9 | 11.3 | 3.8 × 10⁴ | 2.9 |
| 20* | 814.4 | 14.8 | 1.2 × 10³ | 0.8 |
| 21 | 57.9 | 8.1 | 6.1 × 10⁴ | 3.1 |
| 22 | 92.4 | 9.5 | 4.4 × 10⁴ | 3.0 |
| 23* | 95.9 | 6.5 | 3.1 × 10⁴ | 15.2 |
| 24 | 63.2 | 9.8 | 4.3 × 10⁴ | 3.3 |
| 25 | 51.8 | 9.5 | 5.0 × 10⁴ | 3.4 |
| 26 | 54.6 | 9.7 | 5.1 × 10⁴ | 3.5 |
| 27 | 75.3 | 9.5 | 4.3 × 10⁴ | 3.1 |
| 28 | 89.5 | 9.3 | 4.0 × 10⁴ | 3.0 |
| 29 | 83.4 | 9.2 | 4.0 × 10⁴ | 2.9 |
| 30 | 108.9 | 9.3 | 4.5 × 10⁴ | 2.8 |
| 31 | 99.0 | 9.6 | 3.4 × 10⁴ | 2.8 |
| 32* | 354.1 | 4.0 | 1.0 × 10³ | 4.4 |
| 33 | 63.8 | 9.2 | 3.9 × 10⁴ | 2.5 |
| 34 | 81.5 | 9.6 | 4.0 × 10⁴ | 2.4 |
| 35 | 60.5 | 9.9 | 5.2 × 10⁴ | 2.3 |
| 36 | 45.4 | 9.0 | 5.6 × 10⁴ | 3.2 |
| 37 | 95.7 | 10.4 | 3.8 × 10⁴ | 3.0 |
| 38* | 385.2 | 15.1 | 1.0 × 10³ | 0.9 |

Marked * are comparison examples which are outside the claimed scope.

As shown by the EXAMPLES 1-3, addition of $Y_2O_3$ accelerates semiconductorization of $SrTiO_3$, $Sr_{1-x}Ba_xTiO_3$ and $Sr_{1-x}Ca_xTiO_3$, and thereby can decrease specific resistance when the reducing firing is made and shows varistor characteristic when it is reoxidized in the air. However, when the additive is only $Y_2O_3$, the $\alpha$ is small and the tan $\delta$ is large, and the element is not suitable for actual use.

Additions of $Co_2O_3$ and $CuO$ induce increase of $\alpha$ and decrease of tan $\delta$.

Additions of $Ag_2O$ or $Al_2O_3$ improves varistor characteristics, keeping the capacitor characteristics.

The reason of the above-mentioned changes of characteristics by the additions is that these additives segregate at grain boundaries, thereby selectively increasing the resistance of the grain boundaries. The grain boundaries of high resistance formed in this way functions as capacitors with very short gap between electrodes, as well as as varistor. Therefore, the resultant element becomes a varistor having a large capacity.

As the additives to make the grain boundary selectively to a high resistance to give the characteristics of a capacitor and a varistor at the same time, $ZrO_2$, $BaO$, $SiO_2$, $MgO$, $MnO_2$, $B_2O_3$, $NiO$, $MoO_3$, $BeO$, $Fe_2O_3$, $Li_2O$, $Cr_2O_3$, $PbO$, $CaO$, $TiO_2$, $P_2O_5$, $Sb_2O_3$ and $V_2O_5$ are especially effective.

These additives make effect when added in an amount of over 0.001 mol %, but when the amount exceeds 3.000 mol % the characteristic becomes poor. The reason of the characteristic becoming poor is due to increase of thickness of grain boundaries, hence decrease of capacitance thereof, which induces increase of varistor voltage and deterioration of varistor characteristic.

The average diameter of the grain of the element is about 100 μm, and the larger the diameter becomes the more effective in lowering varistor voltage.

Besides, the additives mentioned in the above-mentioned EXAMPLES, other additives, such as two or more kinds of oxides selected from the group consisting of $ZrO_2$, $BaO$, $SiO_2$, $MgO$, $MnO_2$, $B_2O_3$, $NiO$, $MoO_3$, $BeO$, $Fe_2O_3$, $LiO_2$, $Cr_2O_3$, $PbO$, $CaO$, $TiO_2$, $P_2O_5$, $Sb_2O_3$ and $V_2O_5$ can be used, and in such case the similar good effect is obtainable.

Figure 6:
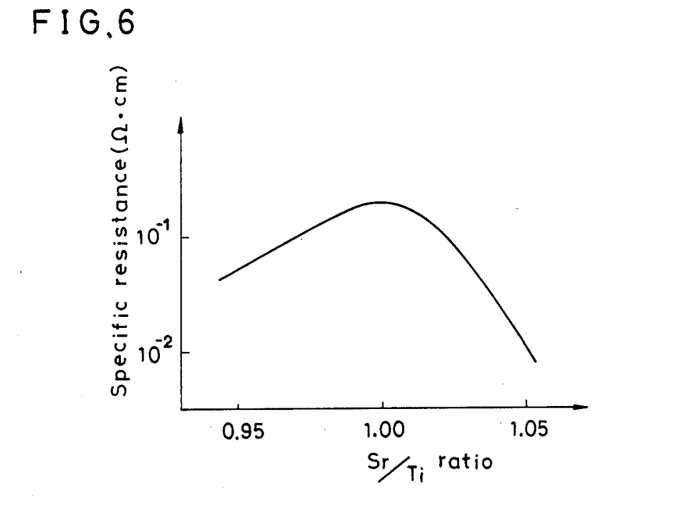
FIG. 6 is a characteristic diagram showing relation between Sr/Ti ratio and specific resistance.
Figure 7:
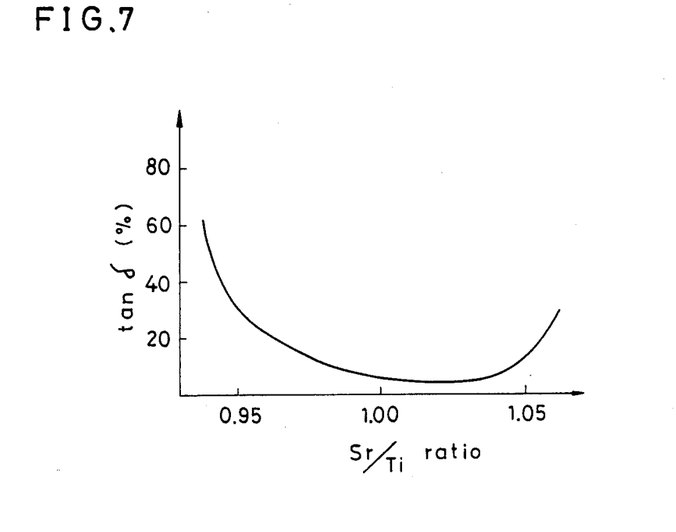
FIG. 7 is a characteristic diagram showing relation between Sr/Ti ratio and tan $\delta$.

With respect to the ratio of Sr/Ti is regarded to be effective on the dielectric characteristic of the dielectric substance of grain boundary type. For instance, the relation between Sr/Ti ratio and specific resistance $\rho$ and tan $\delta$ of the completed element are as shown in FIG. 6 and FIG. 7. As can be understood from these graphs, when the ratio Sr/Ti differs from 1 the specific resistance $\rho$ decreases and the semiconductorization is accelerated. Accordingly, the dielectric constant $\epsilon$ increases. On the other hand, as the ratio Sr/Ti differs from 1, the value tan $\delta$ increases. Accordingly, in actual element, the Sr/Ti ratio within a range of 1.05–0.95 is desirable in view of the harmoney between the specific resistance $\rho$ and tan $\delta$.

Figure 4:
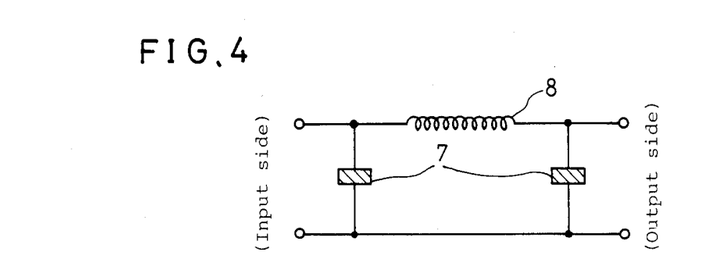
FIG. 4 is a circuit diagram of a noise filter using the voltage dependent non-linear resistance ceramic composition in accordance with the present invention.

On an element manufactured in the above-mentioned process, electrodes were provided by, for instance, conductive paint containing conductive material such as Ag or the like, to complete a capacitor-varistor complex element to serve as a noise filter shown in FIG. 4. When noise A shown in FIG. 5 was impressed on the complex element, the output B of FIG. 5 was obtained. As is obvious from comparison of the curve A with the curve B, noise is satisfactorily removed for all range of frequency by this complex element filter. This is in contradistinction to the conventional filter shown by the curve C when noise elimination is not satisfactorily for all range, especially in the low frequency range. This filter is advantageous in comprising very few component parts and having no internal connection and hence, compactness of the configuration and size. The filter in accordance with the present invention is suitable for noise suppressing circuit in various kinds of electric and electronic appliances which is necessary for a protection of semiconductor devices in such appliances, and is very useful in industrial application.

What is claimed is:

1. A voltage-dependent non-linear resistance ceramic composition consisting essentially of:
   95.000–99.997 mol % of $SrTiO_3$, $Sr_{1-x}Ba_xTiO_3$ ($0.001 \leq x \leq 0.300$) or $Sr_{1-x}Ca_xTiO_3$ ($0.001 \leq x \leq 0.300$) as host material wherein the ratio of Sr/Ti is 1.05–0.95,
   0.001–2.000 mol % of $Y_2O_3$,
   0.001–2.000 mol % of $Co_2O_3$, and
   0.001–1.000 mol % of CuO.

2. A voltage-dependent non-linear resistance ceramic composition consisting essentially of:
   92.000–99.996 mol % of $SrTiO_3$, $Sr_{1-x}Ba_xTiO_3$ ($0.001 \leq x \leq 0.300$) or $Sr_{1-x}Ca_xTiO_3$ ($0.001 \leq x \leq 0.300$) as host material wherein the ratio of Sr/Ti is 1.05–0.95,
   0.001–2.000 mol % of $Y_2O_3$,
   0.001–2.000 mol % of $Co_2O_3$,
   0.001–1.000 mol % of CuO, and
   0.001–3.000 mol % of at least one metal oxide selected from the group consisting of $Ag_2O$ and $Al_2O_3$.

3. A voltage-dependent non-linear resistance ceramic composition consisting essentially of:
   95.00–99.997 mol % of $Sr_{1-x}Ba_xTiO_3$ ($0.001 \leq x \leq 0.300$)
   0.001–2.000 mol % of $Y_2O_3$,
   0.001–2.000 mol % of $Co_2O_3$, and
   0.001–1.000 mol % of CuO.

4. A voltage-dependent non-linear resistance ceramic composition consisting essentially of:
   92.000–99.996 mol % of $Sr_{1-x}Ba_xTiO_3$ ($0.001 \leq x \leq 0.300$),
   0.001–2.000 mol % of $Y_2O_3$,
   0.001–2.000 mol % of $Co_2O_3$,
   0.001–1.000 mol % of CuO, and
   0.001–3.000 mol % of at least one of $Ag_2O$ and $Al_2O_3$.

5. A voltage-dependent non-linear resistance ceramic composition consisting essentially of:
   95.000–99.997 mol % of $Sr_{1-x}Ca_xTiO_3$ ($0.001 \leq x \leq 0.300$),
   0.001–2.000 mol % of $Y_2O_3$,
   0.001–2.000 mol % of $Co_2O_3$, and
   0.001–1.000 mol % of CuO.

6. A voltage-dependent non-linear resistance ceramic composition according to claim 5 consisting of:
   95.000–99.997 mol % of $Sr_{1-x}Ca_xTiO_3$ ($0.001 \leq x \leq 0.300$),
   0.001–2.000 mol % of $Y_2O_3$,
   0.001–2.000 mol % of $Co_2O_3$, and
   0.001–1.000 mol % of CuO.

7. A voltage-dependent non-linear resistance ceramic composition consisting essentially of:
   92.000–99.996 mol % of $Sr_{1-x}Ca_xTiO_3$ ($0.001 \leq x \leq 0.300$),
   0.001–2.000 mol % of $Y_2O_3$,
   0.001–2.000 mol % of $Co_2O_3$,
   0.001–1.000 mol % of CuO, and
   0.001–3.000 mol % of at least one of $Ag_2O$ and $Al_2O_3$.

8. A voltage-dependent non-linear resistance ceramic composition according to claim 7 consisting of:
   92.000–99.996 mol % of $Sr_{1-x}Ca_xTiO_3$ ($0.001 \leq x \leq 0.300$),
   0.001–2.000 mol % of $Y_2O_3$,
   0.001–2.000 mol % of $Co_2O_3$,
   0.001–1.000 mol % of CuO, and
   0.001–3.000 mol % of at least one of $Ag_2O$ and $Al_2O_3$.

9. A voltage-dependent non-linear resistance ceramic composition consisting essentially of:
   93.000–99.995 mol % of $SrTiO_3$ having Sr/Ti ratio of 1.050–0.950,
   0.001–2.000 mol % of $Y_2O_3$,
   0.001–2.000 mol % of $Co_2O_3$,
   0.001–1.000 mol % of CuO, and
   0.001–1.000 mol % of one oxide selected from the group consisting of BaO, $SiO_2$, MgO and $MnO_2$.

10. A voltage-dependent non-linear resistance ceramic composition according to claim 9 consisting of:
    93.000–99.995 mol % of $SrTiO_3$ having an Sr/Ti ratio of 1.050–0.950,
    0.001–2.000 mol % of $Y_2O_3$,
    0.001–2.000 mol % of $Co_2O_3$,
    0.001–1.000 mol % of CuO, and
    0.001–1.000 mol % of one oxide selected from the group consisting of BaO, $SiO_2$, MgO and $MnO_2$.

11. A voltage-dependent non-linear resistance ceramic composition consisting essentially of:
    91.000–99.994 mol % of $SrTiO_3$ having Sr/Ti ratio of 1.050–0.950,
    0.001–2.000 mol % of $Y_2O_3$,
    0.001–2.000 mol % of $Co_2O_3$,
    0.001–1.000 mol % of CuO, and
    0.001–1.000 mol % of $Ag_2O$,
    0.001–1.000 mol % of one oxide selected from the group consisting of BaO, $SiO_2$, MgO and $MnO_2$, and 0.001–1.000 mol % of at least one oxide NiO, MoO$_3$, BeO, Fe$_2$O$_3$, Li$_2$O, Cr$_2$O$_3$, PbO, CaO, TiO$_2$, P$_2$O$_5$, Sb$_2$O$_3$, Al$_2$O$_3$ and V$_2$O$_5$.

12. A voltage-dependent non-linear resistance ceramic composition according to claim 11 consisting of:
95.000–99.994 mol % of SrTiO$_3$ having an Sr/Ti ratio of 1.050–0.950,
0.001–2.000 mol % of Y$_2$O$_3$
0.001–2.000 mol % of Co$_2$O$_3$,
0.001–1.000 mol % of CuO,
0.001–1.000 mol % of Ag$_2$O,
0.001–1.000 mol % of one oxide selected from the group consisting of BaO, SiO$_2$, MgO and MnO$_2$, and
0.001–1.000 mol % of at least one oxide selected from the group consisting of NiO, MoO$_3$ BeO, Fe$_2$O$_3$, Li$_2$O, Cr$_2$O$_3$, PbO, CaO, TiO$_2$, P$_2$O$_5$, Sb$_2$O$_3$, Al$_2$O$_3$ and V$_2$O$_5$.

* * * * *